(12) United States Patent
Ugai et al.

(10) Patent No.: US 7,551,051 B2
(45) Date of Patent: Jun. 23, 2009

(54) RING MAGNET AND METHOD OF MANUFACTURING THE MAGNET

(75) Inventors: Yoshikazu Ugai, Tokyo (JP); Taizo Iwami, Tokyo (JP); Shuichi Takahama, Tokyo (JP); Yuji Nakahara, Tokyo (JP); Jinichi Furukawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 318 days.

(21) Appl. No.: 10/546,827

(22) PCT Filed: Oct. 29, 2003

(86) PCT No.: PCT/JP03/13817

§ 371 (c)(1),
(2), (4) Date: Aug. 25, 2005

(87) PCT Pub. No.: WO2004/077647

PCT Pub. Date: Sep. 10, 2004

(65) Prior Publication Data

US 2006/0158292 A1    Jul. 20, 2006

(30) Foreign Application Priority Data

Feb. 27, 2003  (JP)  ............... 2003-050181

(51) Int. Cl.
*H01F 7/02* (2006.01)
*H01F 1/057* (2006.01)

(52) U.S. Cl. .................. 335/302; 148/101; 419/5

(58) Field of Classification Search ......... 335/302–306; 419/5; 148/101–104

See application file for complete search history.

(56) References Cited

U.S. PATENT DOCUMENTS

| 4,533,407 | A | * | 8/1985 | Das et al. ................. 148/102 |
| 4,818,305 | A | * | 4/1989 | Steingroever ............ 148/103 |
| 5,250,255 | A | | 10/1993 | Sagawa et al. |
| 5,672,363 | A | | 9/1997 | Sagawa et al. |
| 5,913,255 | A | * | 6/1999 | Kikuchi et al. ............. 75/244 |
| 6,926,777 | B2 | * | 8/2005 | Reppel et al. ............. 148/101 |
| 2003/0110617 | A1 | | 6/2003 | Reppel et al. |

FOREIGN PATENT DOCUMENTS

| JP | 58-56401 | 4/1983 |
| JP | 3-235311 | 10/1991 |
| JP | 4-363010 | 12/1992 |
| JP | 8-222419 | 8/1996 |
| JP | 9-233776 | 9/1997 |
| JP | 10-55914 | 2/1998 |
| JP | 10-264119 | 10/1998 |
| JP | 11-186027 | 7/1999 |
| JP | 2000-12359 | 1/2000 |
| JP | 2003-17309 | 1/2003 |
| JP | 2003-518331 | 6/2003 |

\* cited by examiner

*Primary Examiner*—Lincoln Donovan
*Assistant Examiner*—Bernard Rojas
(74) *Attorney, Agent, or Firm*—Leydig, Voit & Mayer, Ltd.

(57) ABSTRACT

Radially oriented ring-shaped preliminarily molded pieces of a ring magnet are stacked in an axial direction to form a ring-shaped molded body, in which end faces of the ring-shaped preliminarily molded pieces are bonded together. This ring-shaped molded body is sintered and heat-treated to produce the ring magnet. Ring magnets which are less susceptible to deterioration of magnetic properties due to a disturbance of magnetic orientation near lamination boundary surfaces are produced. The invention provides a method of manufacturing such ring magnets with high efficiency.

20 Claims, 30 Drawing Sheets

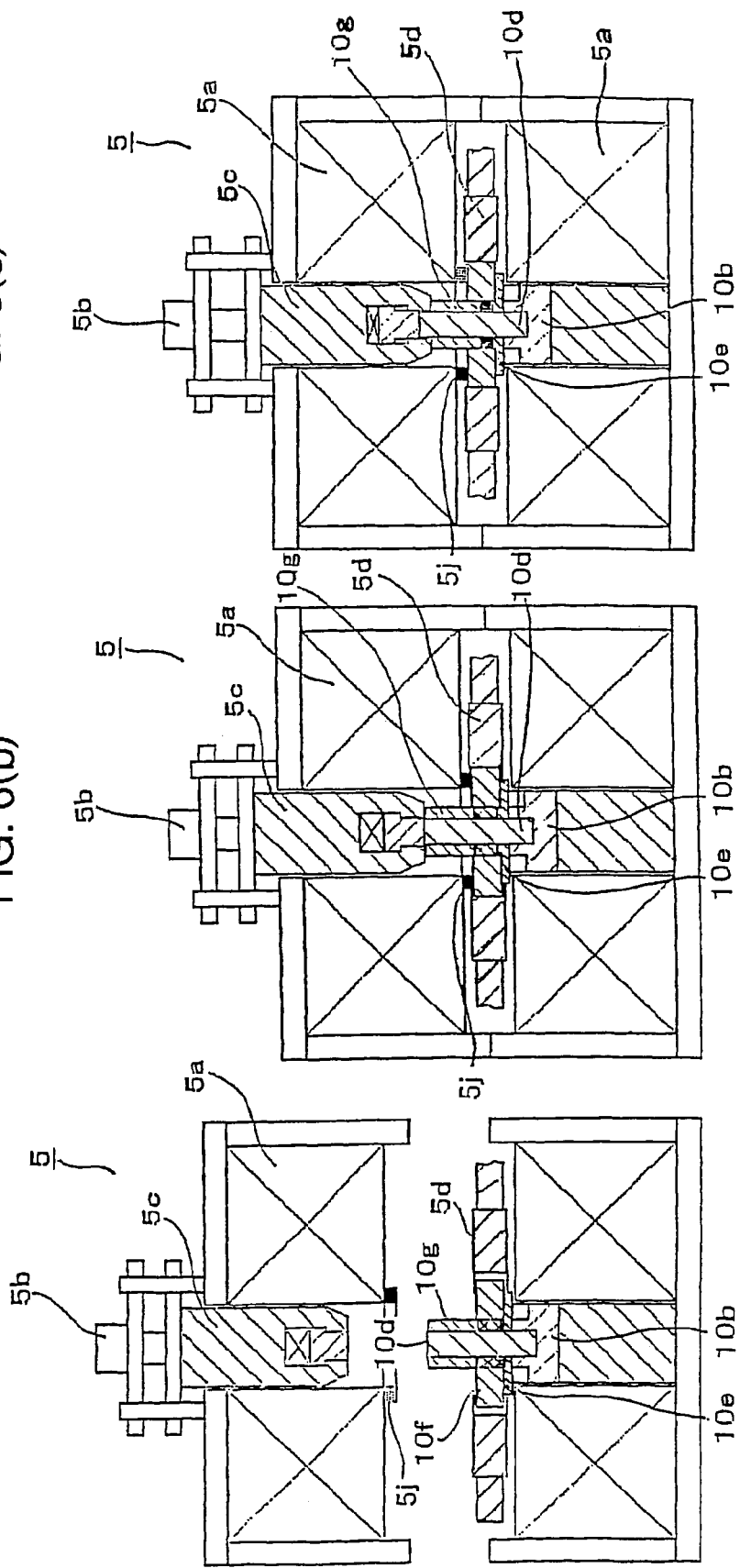

FIG. 7(a)
FIG. 7(b)
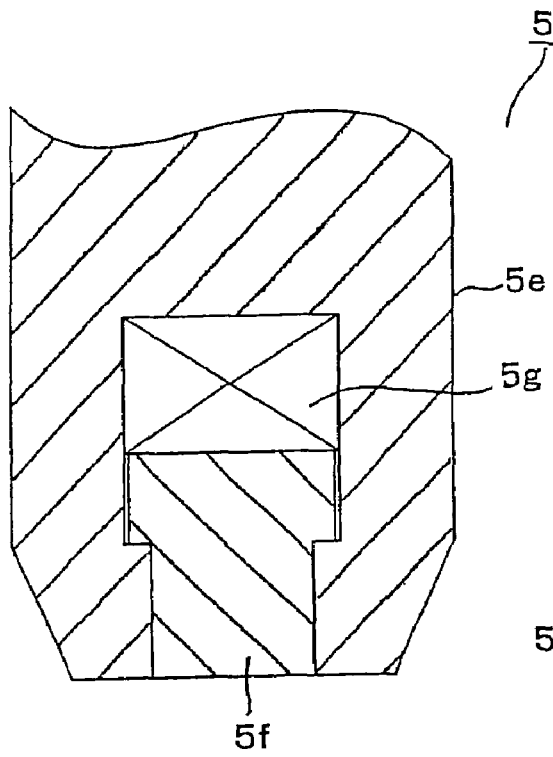
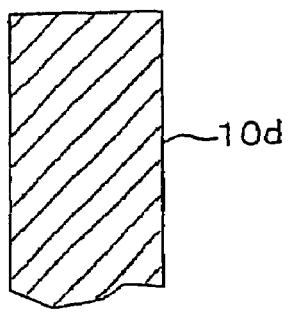
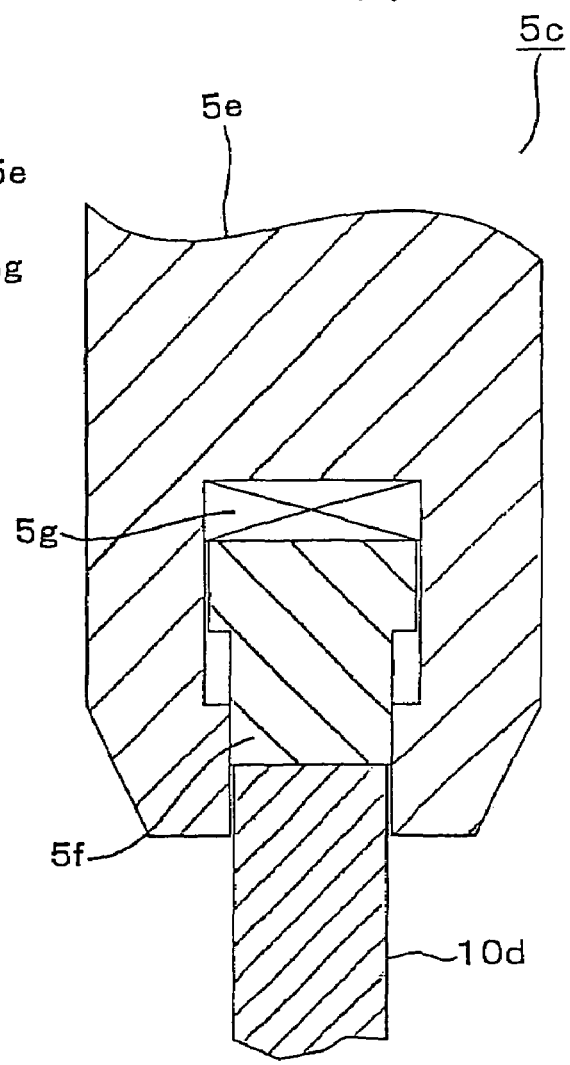

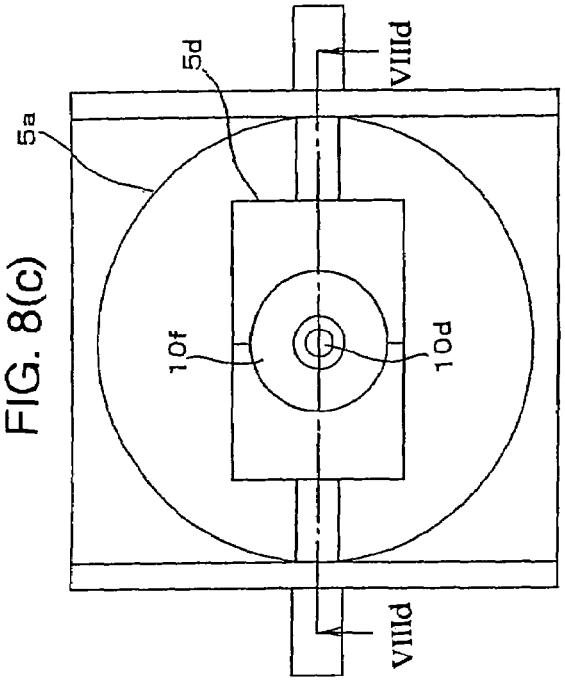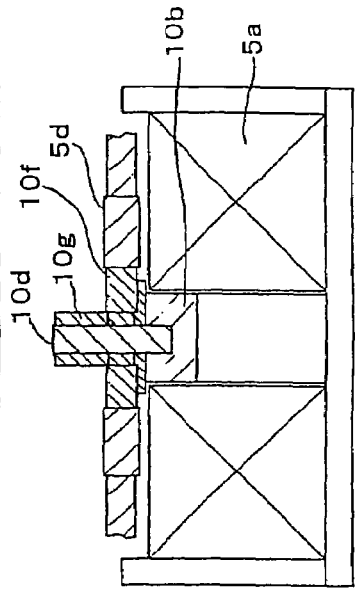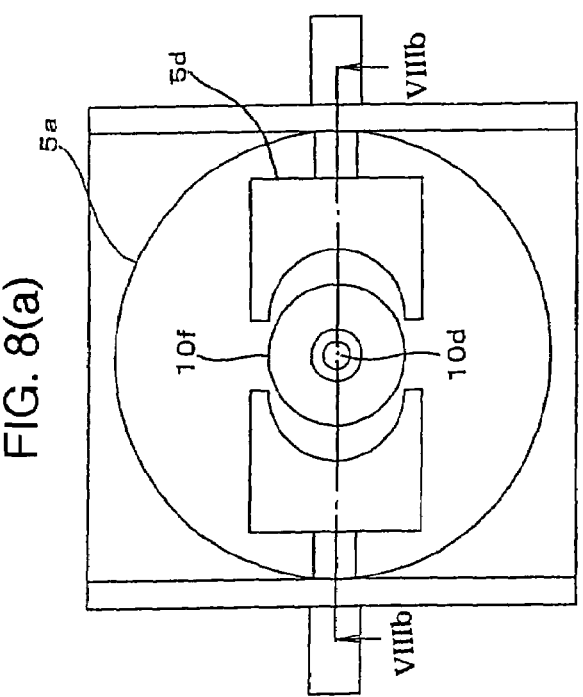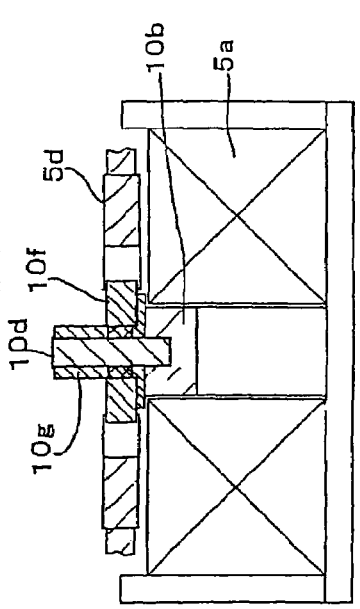
FIG. 8(a)
FIG. 8(b)
FIG. 8(c)
FIG. 8(d)

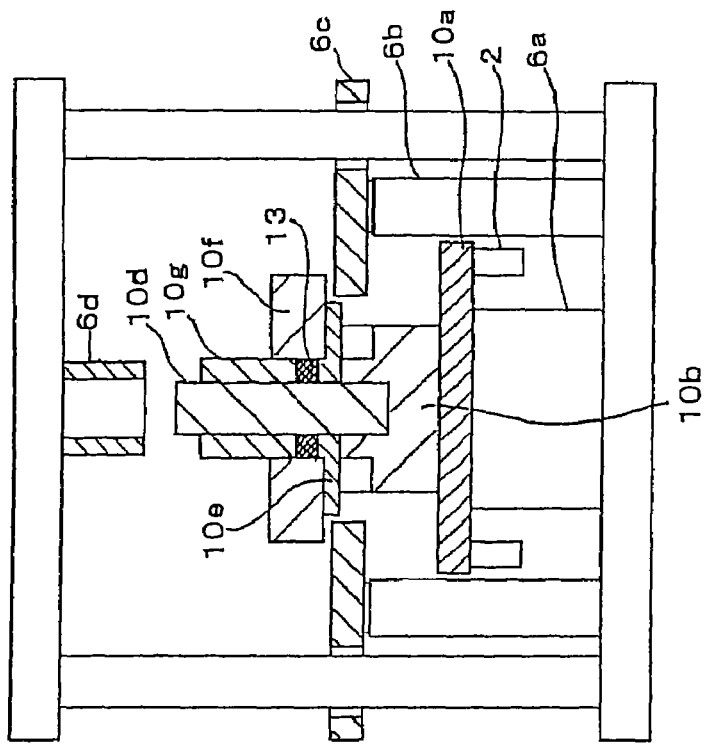
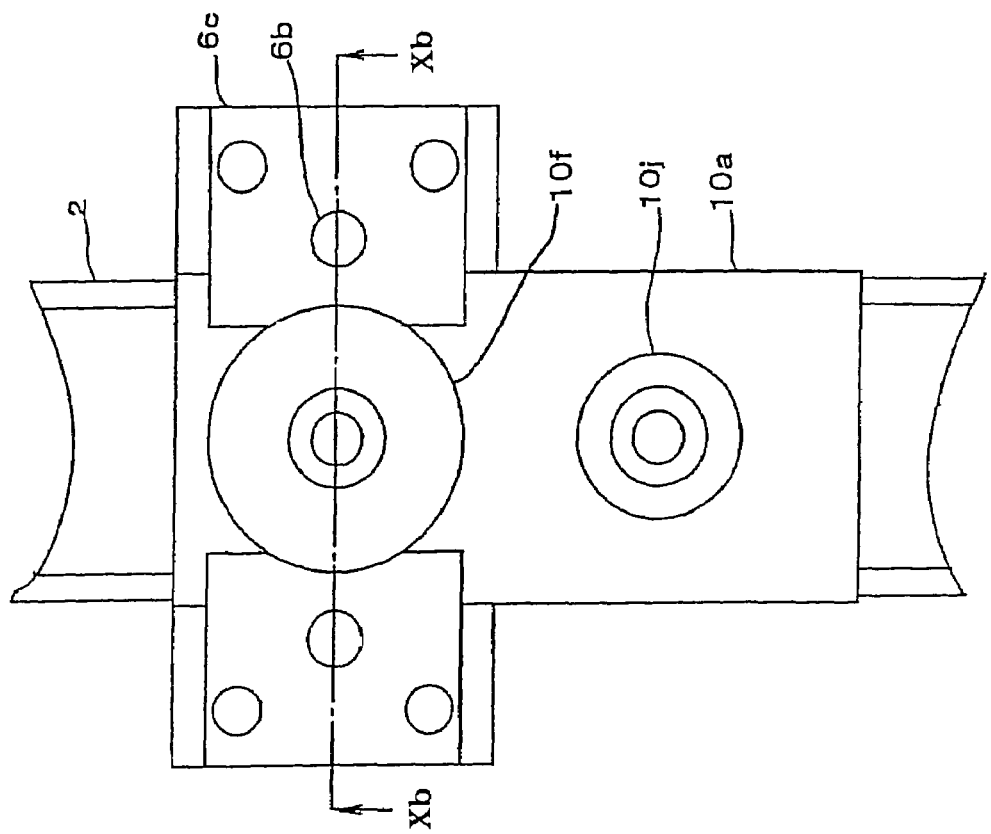

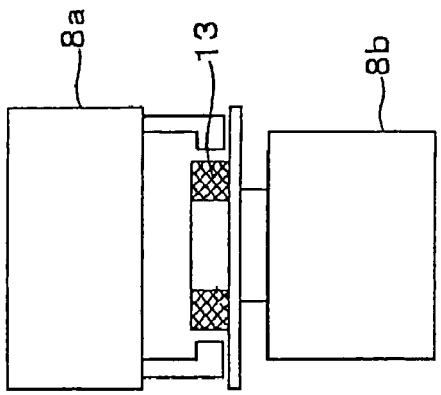
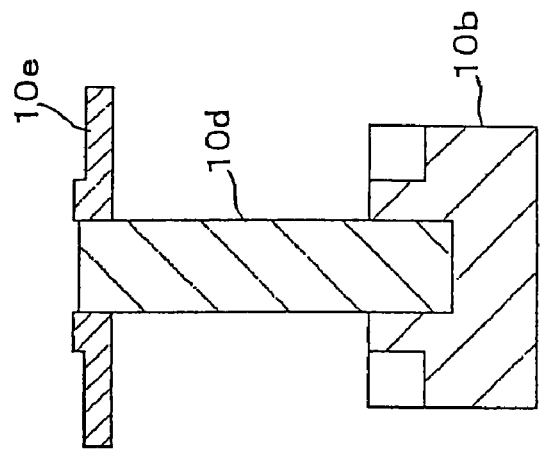
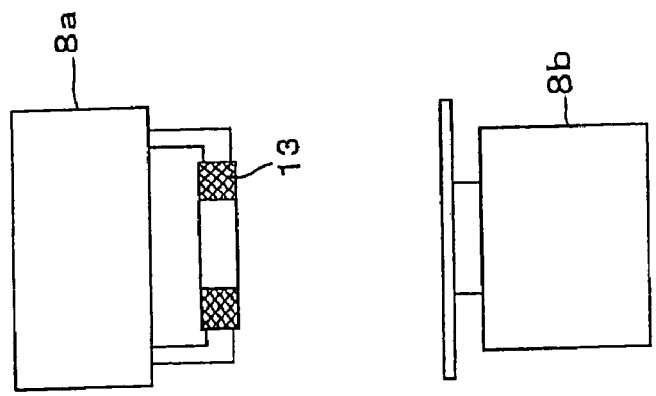
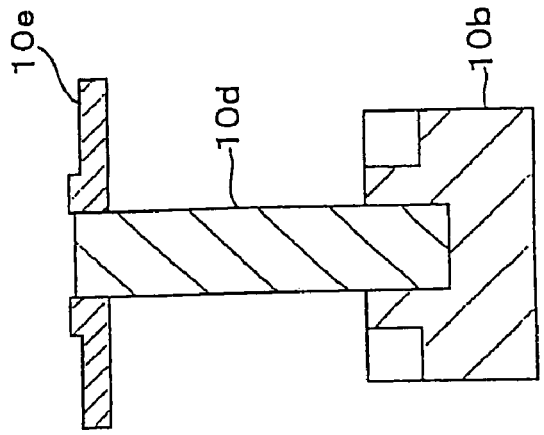
FIG. 15(a)
FIG. 15(b)

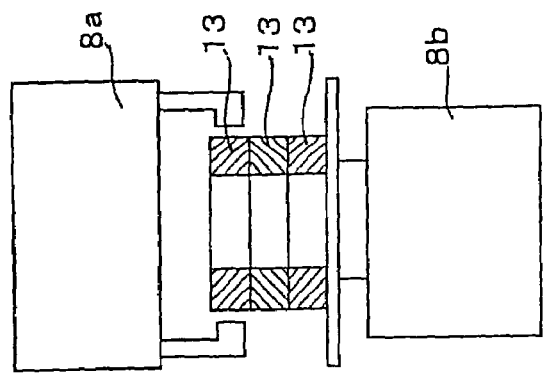
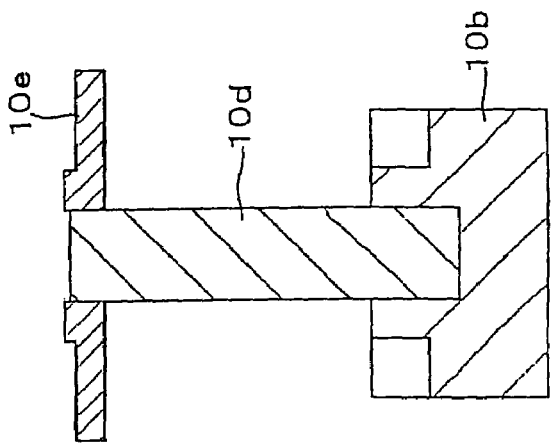
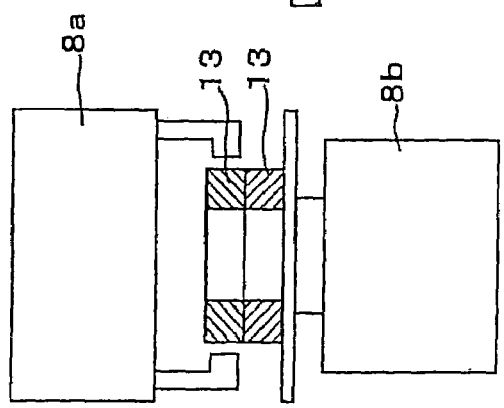
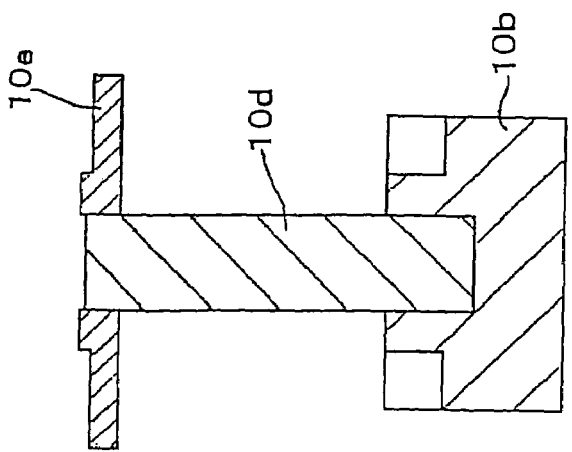
FIG. 16(a)
FIG. 16(b)

FIG. 19(a)
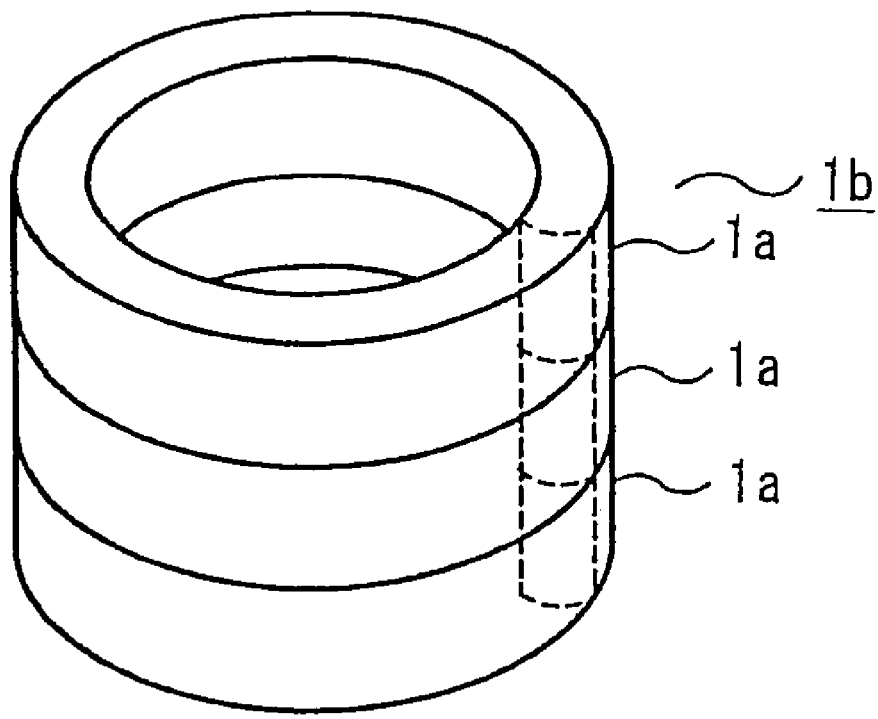
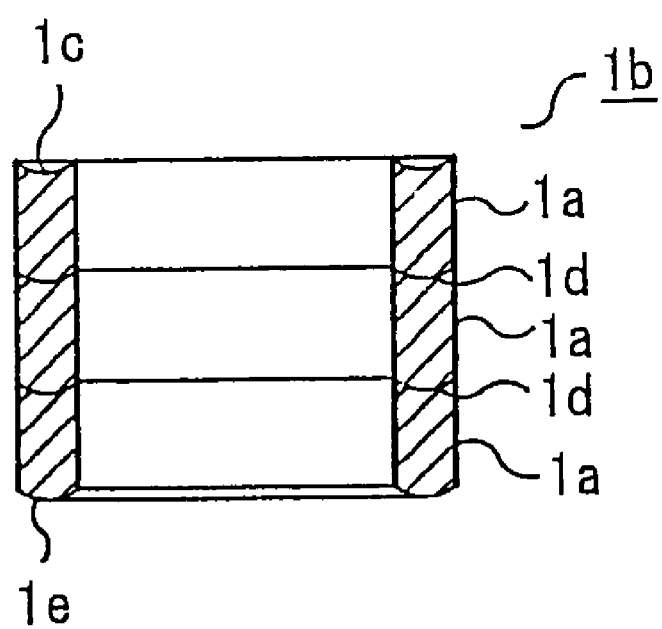
FIG. 19(b)

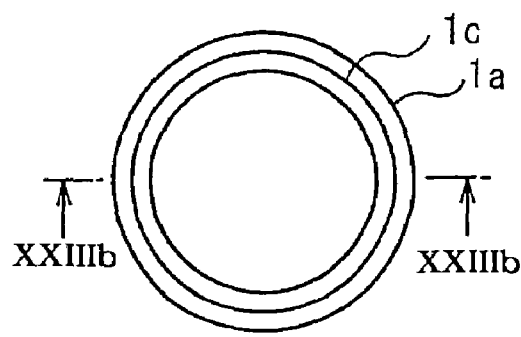
FIG. 23(a)
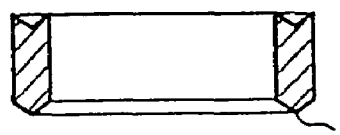
FIG. 23(b)
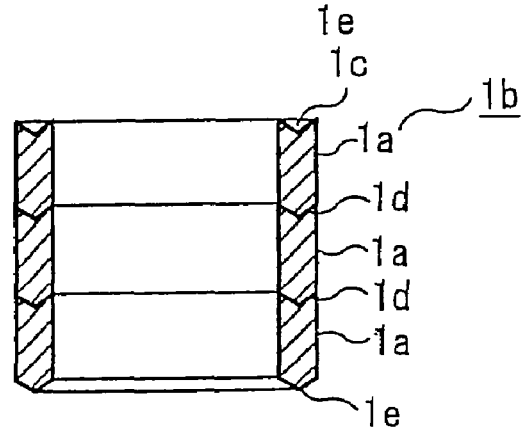
FIG. 23(c)
FIG. 24
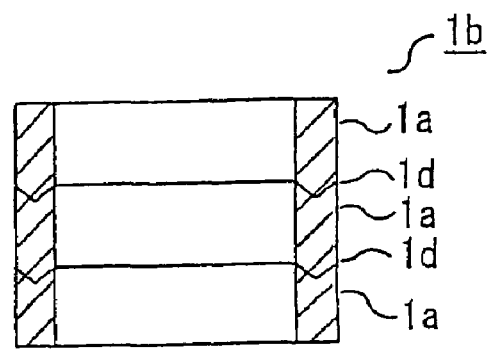

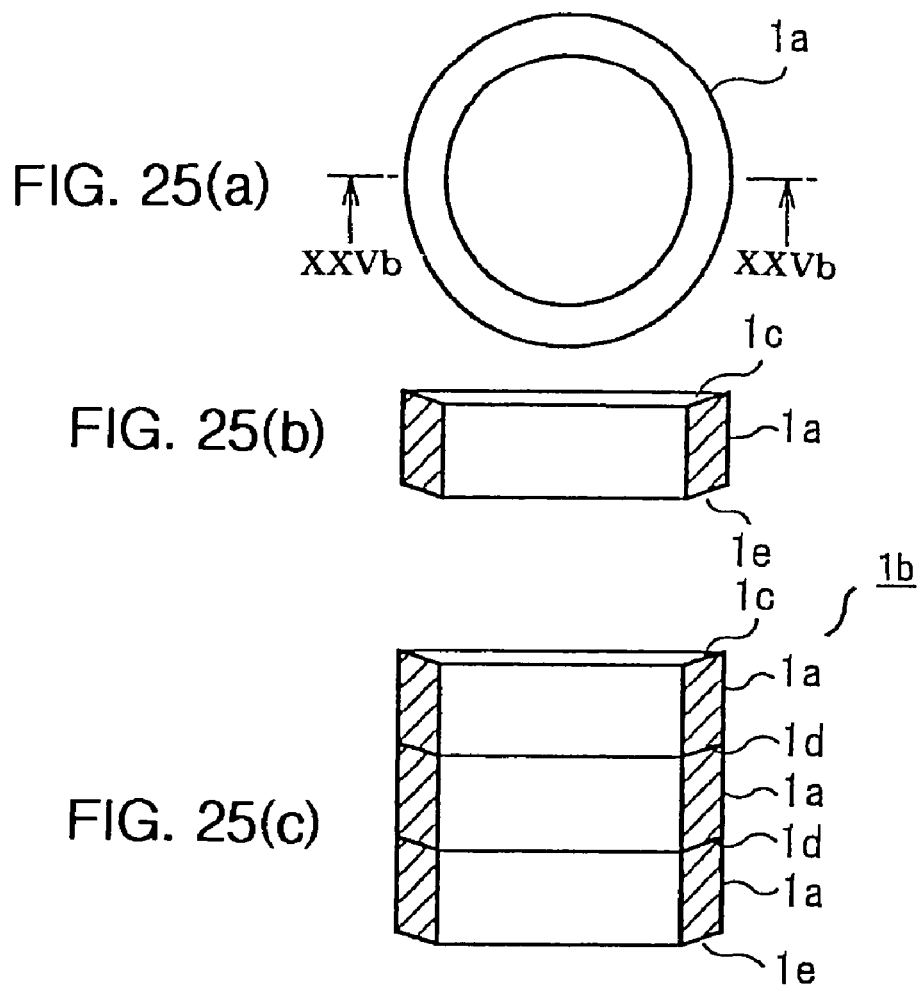
FIG. 25(a)
FIG. 25(b)
FIG. 25(c)
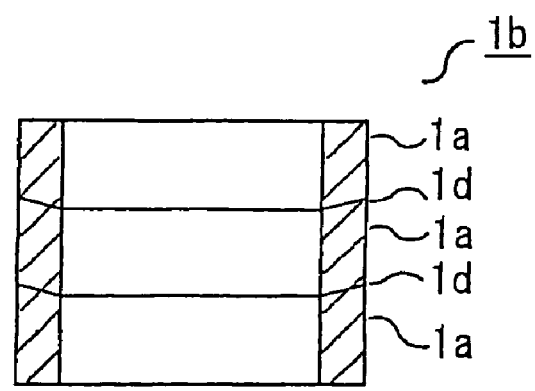
FIG. 26

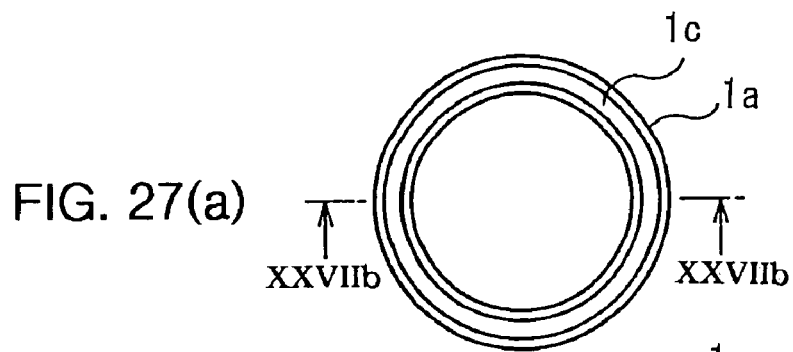
FIG. 27(a)
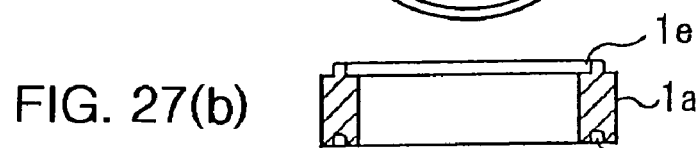
FIG. 27(b)
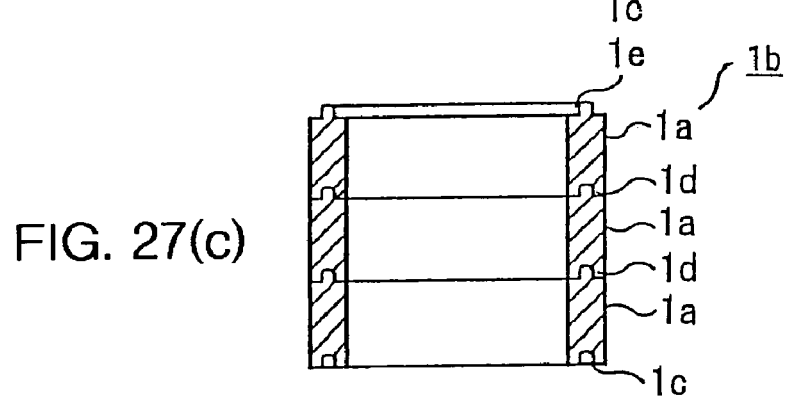
FIG. 27(c)
FIG. 28
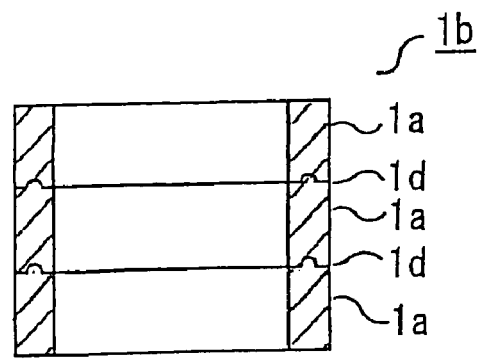

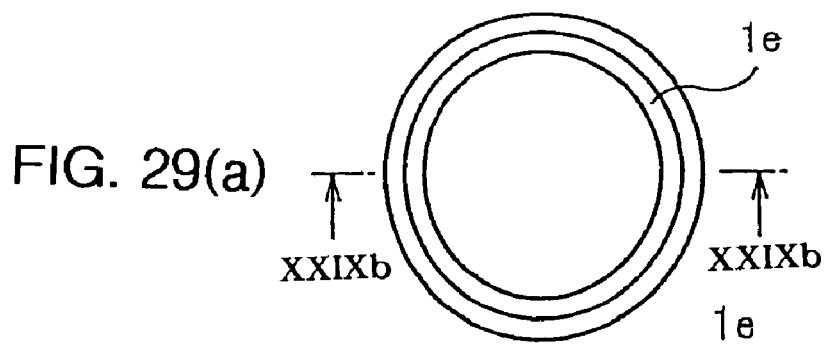
FIG. 29(a)
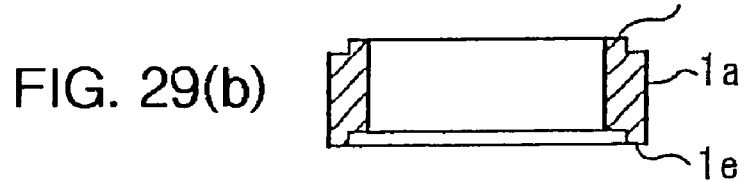
FIG. 29(b)
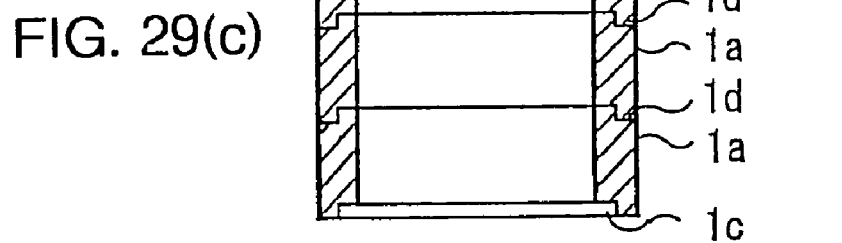
FIG. 29(c)
FIG. 30
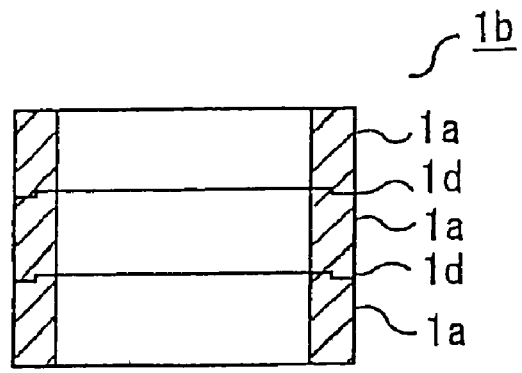

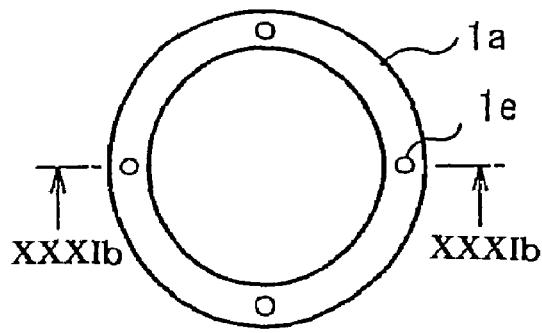
FIG. 31(a)
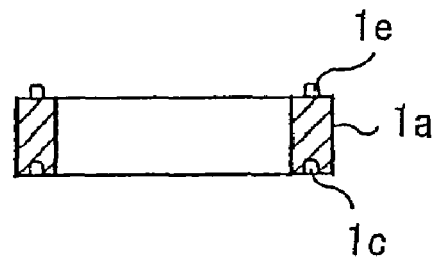
FIG. 31(b)
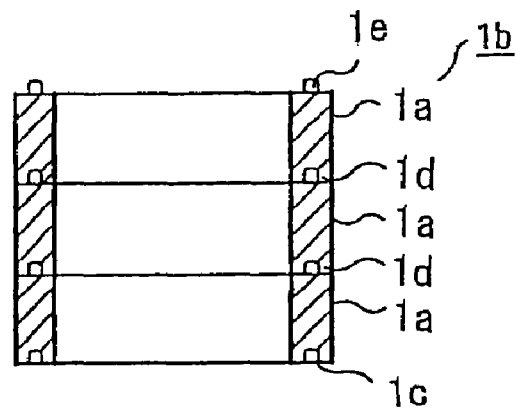
FIG. 31(c)
FIG. 32
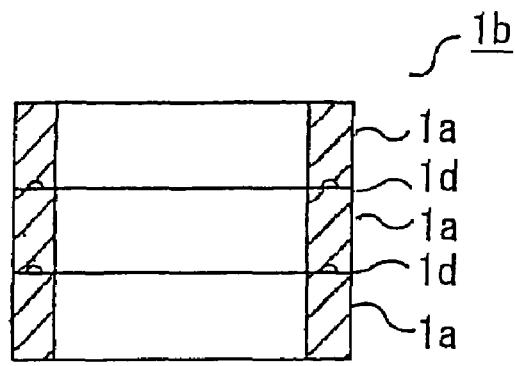

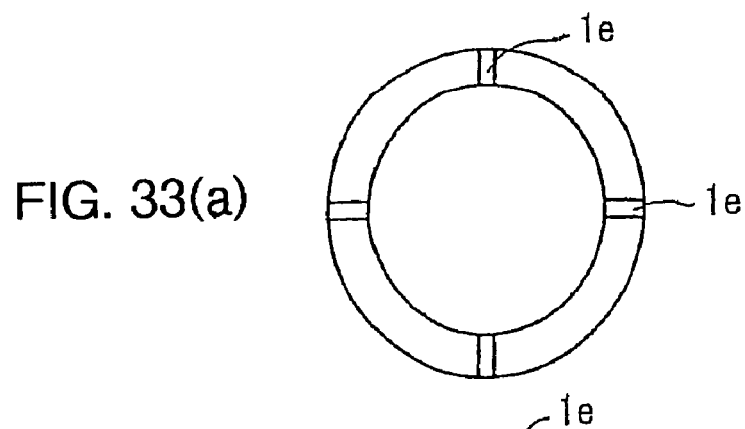
FIG. 33(a)
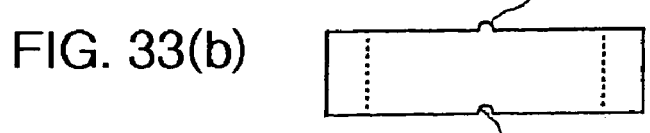
FIG. 33(b)
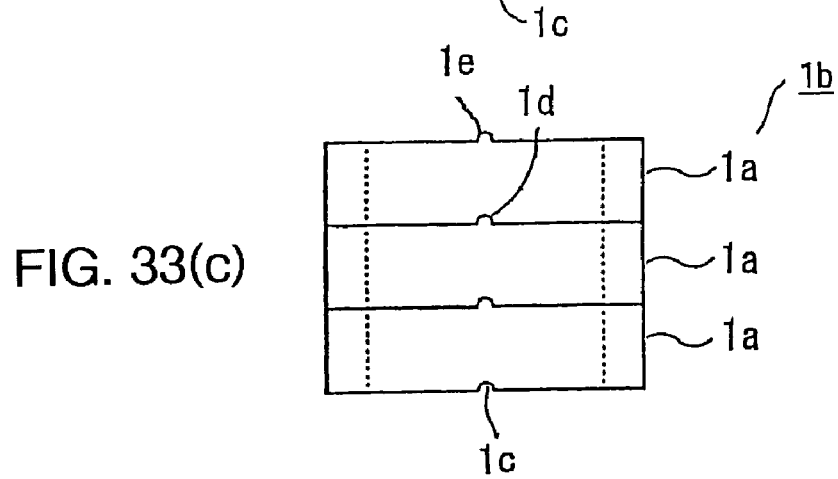
FIG. 33(c)
FIG. 34
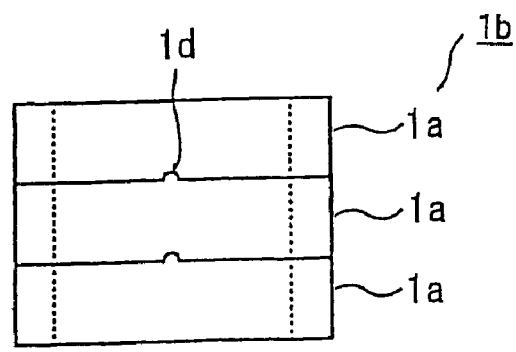

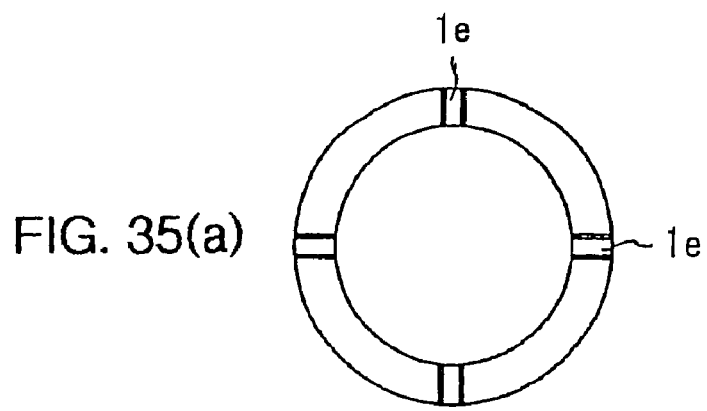
FIG. 35(a)
FIG. 35(b)
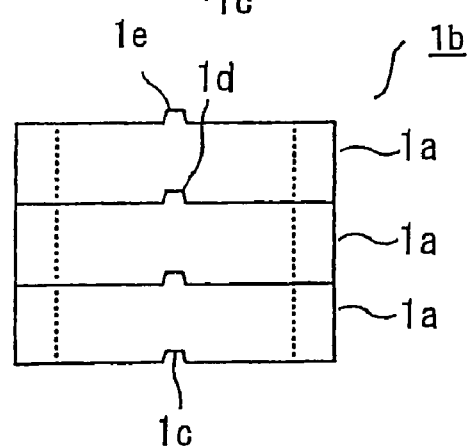
FIG. 35(c)
FIG. 36
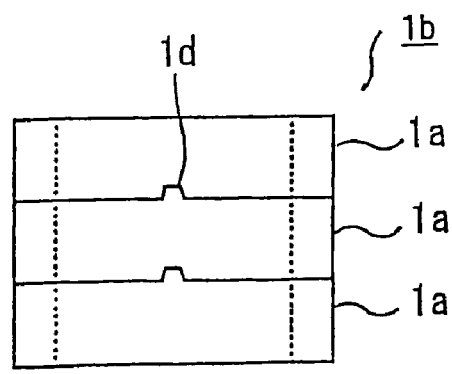

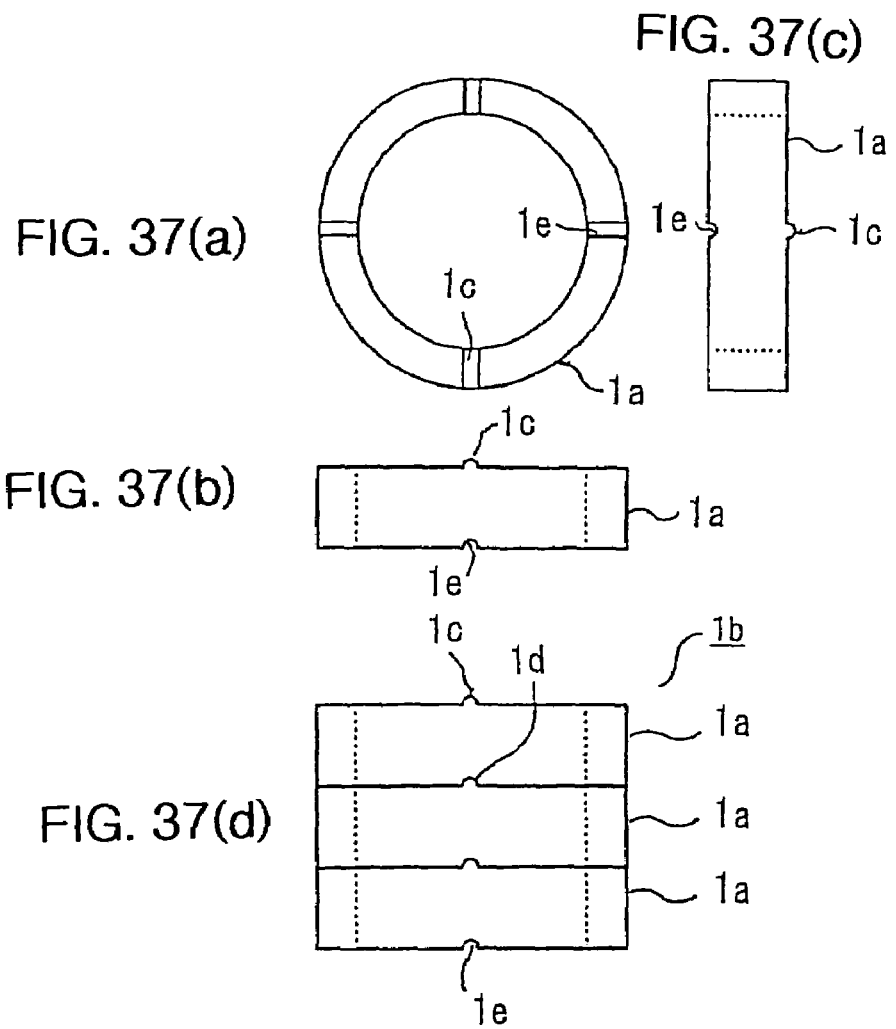
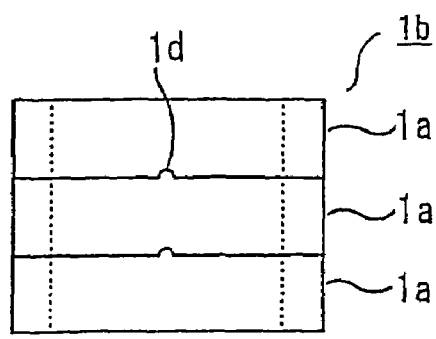

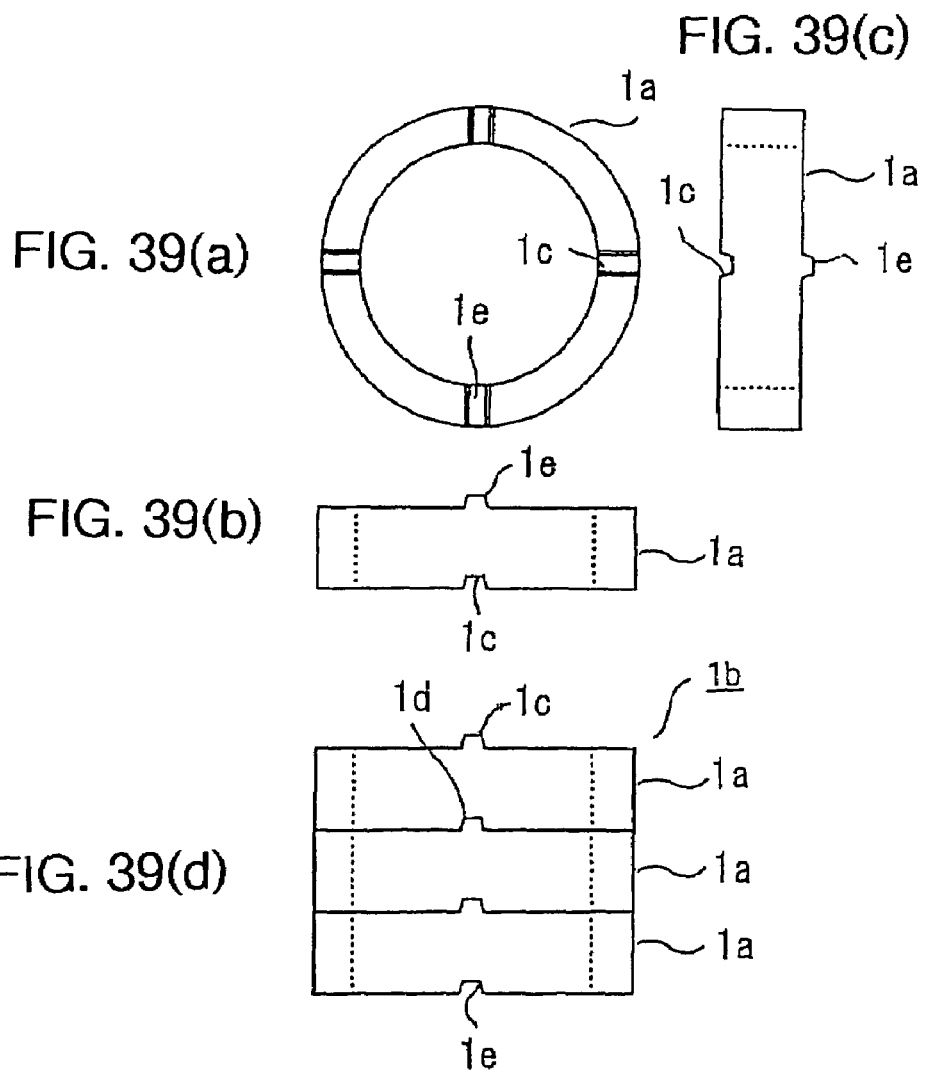
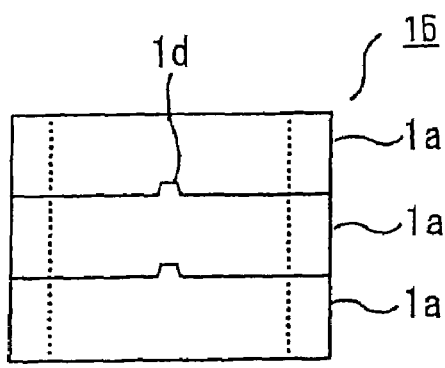

RING MAGNET AND METHOD OF MANUFACTURING THE MAGNET

TECHNICAL FIELD

The present invention relates generally to a ring magnet used in a rotor of a motor or the like. More particularly, the invention pertains to a structure for obtaining an axially elongate ring magnet and a method of manufacturing such a ring magnet.

BACKGROUND ART

Conventionally, a method of manufacturing a ring-shaped permanent magnet includes the steps of filling powder of magnet molding material into a cavity of a metal die unit and molding the powder of the magnet molding material by press working while magnetically orienting the magnet molding powder by applying a magnetic field to the powder by means of a pair of coils situated in a surrounding area of the metal die unit. The metal die unit has a lower die section which includes a core, a lower punch and a die into which the core and the lower punch are inserted, creating a cavity in the lower die section. An upper punch positioned against the die and the lower punch pressurizes magnetic powder placed in the cavity.

If such a molding method is used for forming axially long cylindrical magnets in forming these radially oriented anisotropic ring magnets in a magnetic field which are widely used in small motors, there arises a problem that a sufficient degree of orienting magnetic field intensity is not obtained, resulting in a reduction in the degree of magnetic orientation of the magnetic powder and an inability to achieve high magnetic properties.

Generally, when a ring magnet is radially oriented magnetically, a magnetic flux passing through a core of a metal die unit for molding magnetic powder into a ring shape becomes equal to a magnetic flux passing within the inside perimeter of a die. Therefore, expressing the inside diameter of the ring magnet (the core diameter of the metal die unit) as Di, the outside diameter of the ring magnet (the inside diameter of the die of the metal die unit) as Do, the height of the ring magnet as H, the magnetic flux passing through the core of the metal die unit as Bc, and the magnetic flux passing within the inside perimeter of the die as Bd, there is a relationship given by equation (1) below:

$$2xp/4 \times Di^2 \times Bc = p \times Do \times H \times Bd \quad (1)$$

A steel product, such as S45C, if used for the core of the metal die unit, has a saturation flux density of approximately 1.5T. In this case, substituting Bc=1.5 in equation (1) above and assuming that a magnetic field necessary for magnetic orientation is equal to or larger than 1.0T which translates to Bd=1.0T, the height H of the ring magnet which can be molded with magnetic orientation is given by equation (2) below:

$$H = 3Di^2/4Do \quad (2)$$

A problem which will arise when the ring magnet is formed in a magnetic field is a reduction in magnetic orientation performance that occurs if the axial length of the ring magnet exceeds the value of H of equation (2) above. Accordingly, conventional practice has been to produce ring magnet pieces each having a short axial length which is equal to or smaller than the value of H of equation (2) above and join them with a bonding agent, for instance, to manufacture a ring magnet having a necessary axial length.

Also, as shown in Japanese Patent Application Publication No. Hei 9-233776, for example, there is proposed a method of forming a magnet having a necessary axial length by laminating molded magnet pieces in a metal die, each of the molded magnet pieces having a length that falls within a range in which these magnet pieces can be formed in a magnetic field.

Also, as shown in Japanese Patent Application Publication No. Hei 10-55914, for example, there is proposed a method including the steps of forming preliminarily molded pieces in a magnetic field and joining a plurality of these preliminarily molded pieces into a single structure by pressurizing the same with a pressurizing force which is greater than a pressurizing force applied during preliminary molding.

While a conventional radially oriented anisotropic ring magnet is manufactured by forming magnet pieces magnetically oriented in radial directions and each having a short axial length in a particular shape and bonding and stacking the magnet pieces with a bonding agent to make a ring magnet having a necessary axial length, this method is poor in productivity. Additionally, this method has a problem that the accuracy of outside diameter worsens due to misalignment of central axes of the individual magnet pieces when stacked, and unevenness of air gap occurs when the magnet pieces are assembled with a stator, for instance, resulting in a deterioration in the precision in shape at assembly as well as in magnetic properties.

Also, in the method in which a molded magnet unit having a necessarily long axial length is formed by stacking molded magnet pieces each having a short axial length in a metal die, magnetic powder is additionally filled on top of an already molded magnet piece and a newly molded magnet piece is formed thereon while applying a magnetic field. Therefore, there has been a problem that magnetic orientation in the proximity of a lamination boundary surface between the previously molded magnet piece and the newly molded magnet piece is likely to be disturbed, resulting in a deterioration of magnetic properties.

Also, there has been a problem that magnetic orientation is apt to be disturbed in the proximity of side surfaces of the molded magnet unit as the side surfaces slide along the metal die when the already molded magnet unit is moved to a position below the metal die, resulting in a deterioration of magnetic properties.

Also, since an initially molded magnet piece is subjected to repeated cycles of pressurization, there occurs a difference in the number of pressurization cycles between the initially molded magnet piece and a finally molded magnet piece, resulting in a density difference therebetween, consequently causing a problem that deformation occurs during sintering.

Also, in the method in which a plurality of preliminarily molded pieces are joined into a single structure by pressurizing the same with the pressurizing force which is greater than the pressurizing force applied during preliminary molding, there is a problem that a larger molding facility is required for repressurization and the preliminarily molded pieces are susceptible to breakage at the time of repressurization.

This invention has been made to solve the aforementioned problems. Accordingly, it is an object of the invention to provide a ring magnet and a method of manufacturing the ring magnet which make it possible to achieve a reduction in deterioration of magnetic properties due to a disturbance of magnetic orientation in the proximity of each lamination boundary surface between laminated preliminarily molded pieces, as well as high productivity and improved precision in shape.

DISCLOSURE OF THE INVENTION

A first ring magnet according to the present invention is a ring magnet produced by stacking a plurality of radially oriented ring-shaped preliminarily molded pieces in an axial direction to form a ring-shaped molded body and sintering the aforementioned ring-shaped molded body.

According to this structure, it is possible to manufacture ring magnets which are less susceptible to deterioration of magnetic properties in boundary regions between the adjacent ring-shaped preliminarily molded pieces with high productivity.

A second ring magnet according to the present invention is a ring magnet which is structured in such a way that a recess is formed in one of both end faces in the axial direction of each of the aforementioned ring-shaped preliminarily molded pieces while a protrusion is formed on the other end face, and the aforementioned recess and the aforementioned protrusion of the aforementioned ring-shaped preliminarily molded pieces which are adjacent to each other along the aforementioned axial direction are fitted together.

According to this structure, it is possible to easily align central axes of the individual ring-shaped preliminarily molded pieces and thereby obtain a product that offers high precision in shape and prevents displacement of the individual ring-shaped preliminarily molded pieces during transportation.

A third ring magnet according to the present invention is a ring magnet which is structured in such a way that the aforementioned recess and protrusion formed in the aforementioned end faces are arc-shaped in cross section.

According to this structure, it is possible to easily align central axes of the individual ring-shaped preliminarily molded pieces by fitting the arc-shaped recess and protrusion to each other and thereby obtain a product that offers high precision in shape and prevents displacement of the individual ring-shaped preliminarily molded pieces during transportation.

A fourth ring magnet according to the present invention is a ring magnet which is structured in such a way that the aforementioned recess and protrusion formed in the aforementioned end faces are V-shaped in cross section.

According to this structure, it is possible to easily align central axes of the individual ring-shaped preliminarily molded pieces by fitting the V-shaped recess and protrusion to each other and thereby obtain a product that offers high precision in shape and prevents displacement of the individual ring-shaped preliminarily molded pieces during transportation.

A fifth ring magnet according to the present invention is a ring magnet which is structured in such a way that the aforementioned recess and protrusion are produced by making a stepped structure between an inner peripheral part and an outer peripheral part of each of the aforementioned end faces.

According to this structure, it is possible to easily align central axes of the individual ring-shaped preliminarily molded pieces by fitting stepped parts between the inner peripheral part and the outer peripheral part of the end faces to each other and thereby obtain a product that offers high precision in shape and prevents displacement of the individual ring-shaped preliminarily molded pieces during transportation. In addition, if the stepped parts are tapered, it is possible to stack the preliminarily molded pieces with high precision without damaging the preliminarily molded pieces in a stacking process thereof.

A sixth ring magnet according to the present invention is a ring magnet which is structured in such a way that the aforementioned recess and protrusion are produced by forming a slant surface between an inner peripheral part and an outer peripheral part of each of the aforementioned end faces.

According to this structure, it is possible to easily align central axes of the individual ring-shaped preliminarily molded pieces by fitting the slant surfaces between the inner peripheral part and the outer peripheral part of the end faces to each other and thereby obtain a product that offers high precision in shape and prevents displacement of the individual ring-shaped preliminarily molded pieces during transportation.

A seventh ring magnet according to the present invention is a ring magnet which is structured in such a way that the aforementioned recess and protrusion constitute a plurality of spherical parts formed at specific intervals along a circumferential direction.

According to this structure, it is possible to easily align central axes of the individual ring-shaped preliminarily molded pieces by fitting the protruding spherical parts into the recessed spherical parts and thereby obtain a product that offers high precision in shape and prevents displacement of the individual ring-shaped preliminarily molded pieces during transportation.

An eighth ring magnet according to the present invention is a ring magnet which is structured in such a way that the cross section of the aforementioned recess and protrusion is arc-shaped, V-shaped, U-shaped or trapezoidal.

According to this structure, it is possible to easily align central axes of the individual ring-shaped preliminarily molded pieces by fitting the protruding arc-shaped, V-shaped, U-shaped or trapezoidal part into the recessed arc-shaped, V-shaped, U-shaped or trapezoidal part, respectively, and thereby obtain a product that offers high precision in shape and prevents displacement of the individual ring-shaped preliminarily molded pieces during transportation.

A ninth ring magnet according to the present invention is a ring magnet which is structured in such a way that the aforementioned recess and protrusion have a ringlike shape formed along the aforementioned end faces.

According to this structure, it is possible to easily align central axes of the individual ring-shaped preliminarily molded pieces by fitting the protruding ringlike part into the recessed ringlike part and thereby obtain a product that offers high precision in shape and prevents displacement of the individual ring-shaped preliminarily molded pieces during transportation.

A tenth ring magnet according to the present invention is a ring magnet which is structured in such a way that the aforementioned recess and protrusion constitute a plurality of parts formed to extend in radial directions.

According to this structure, it is possible to easily align central axes of the individual ring-shaped preliminarily molded pieces by fitting a plurality of radially extending protruding parts into a plurality of radially extending protruding recessed parts and thereby obtain a product that offers high precision in shape and prevents displacement of the individual ring-shaped preliminarily molded pieces during transportation.

An eleventh ring magnet according to the present invention is a ring magnet which is structured in such a way that the aforementioned one end face in which the aforementioned recess is formed further has a protrusion formed on the same end face while the aforementioned other end face on which the aforementioned protrusion is formed further has a recess formed in the same end face.

According to this structure, it is possible to easily align central axes of the individual ring-shaped preliminarily molded pieces by fitting the protrusions and the recesses formed as mentioned above to one another and thereby obtain a product that offers high precision in shape and prevents displacement of the individual ring-shaped preliminarily molded pieces during transportation.

A twelfth ring magnet according to the present invention is a ring magnet which is structured in such a way that the upper end face of the aforementioned ring-shaped preliminarily molded piece in a topmost layer and the lower end face of the aforementioned ring-shaped preliminarily molded piece in a bottommost layer are flat surfaces on which neither of the aforementioned recess and protrusion is formed.

According to this structure, it is possible to maintain the ring-shaped molded body in a stable condition during placement and transportation and shorten its axial length.

A first method of manufacturing a ring magnet according to the present invention includes a process of forming a plurality of radially oriented ring-shaped preliminarily molded pieces, a process of forming a ring-shaped molded body by stacking the aforementioned ring-shaped preliminarily molded pieces in an axial direction, and a process of sintering the aforementioned ring-shaped molded body.

According to this method, it is possible to manufacture ring magnets which are less susceptible to deterioration of magnetic properties in boundary regions with high productivity.

A second method of manufacturing a ring magnet according to the present invention is a method in which the aforementioned ring-shaped molded body is pressurized at a pressure of 50 MPa or less in the direction in which the aforementioned ring-shaped molded body has been stacked.

According to this method, it is possible to ensure close contact between the ring-shaped preliminarily molded pieces.

A third method of manufacturing a ring magnet according to the present invention is a method in which the process of forming the cylindrical molded body and the process of forming the ring-shaped molded body successively transfer a plurality of transferable metal die units to individual processes mentioned below in a manner that allows execution of the aforementioned individual processes, each of the aforementioned transferable metal die units including a die, a core which is inserted into the interior of the aforementioned die, forming a ringlike space between the aforementioned die and the aforementioned core, a lower punch which closes the bottom of the aforementioned space, forming a cavity into which magnetic powder is fed and filled, and an upper punch for pressurizing the magnetic powder fed into the aforementioned cavity, the process of forming the cylindrical molded body and the process of forming the ring-shaped molded body including a process of feeding and filling the aforementioned magnetic powder into the aforementioned cavity, a process of forming each of the aforementioned ring-shaped preliminarily molded pieces by pressurizing the aforementioned magnetic powder in the axial direction while applying a radially orienting magnetic field to the interior of the aforementioned cavity, a process of drawing out each of the aforementioned ring-shaped preliminarily molded pieces from the aforementioned transferable metal die unit, and a process of stacking in multiple layers the ring-shaped preliminarily molded pieces which have been drawn out of the aforementioned transferable metal die unit in the axial direction of the aforementioned ring-shaped preliminarily molded pieces.

According to this method, it is possible to shorten tact time and manufacture ring magnets which are less susceptible to deterioration of magnetic properties in boundary regions between the adjacent ring-shaped preliminarily molded pieces with high productivity.

A fourth method of manufacturing a ring magnet according to the present invention is a method including a process of weighing a specified quantity of the magnetic powder to be fed into the aforementioned cavity.

According to this method, the height of the ring-shaped preliminarily molded pieces becomes constant and it becomes possible to prevent unwanted force and impact from being exerted on the ring-shaped preliminarily molded pieces during the stacking process thereof.

A fifth method of manufacturing a ring magnet according to the present invention is a method including a process of moving the aforementioned upper punch to a location above the aforementioned cavity and inserting the aforementioned upper punch into the aforementioned cavity.

According to this method, it is possible to set the transferable metal die unit in a condition where the magnetic powder in the cavity can be pressurized by the upper punch after feeding and filling the magnetic powder in the cavity.

Also, as it is possible to form the magnetic powder by pressure molding in a condition in which the upper punch is inserted into the cavity, there is no need for a drive mechanism for positioning individual parts of the metal die unit with high precision during pressure molding.

A sixth method of manufacturing a ring magnet according to the present invention is a method in which each of the aforementioned ring-shaped preliminarily molded pieces is drawn out of the aforementioned die while being pressurized in process of drawing out the aforementioned ring-shaped preliminarily molded piece from the aforementioned transferable metal die unit.

According to this method, a difference in internal stresses between an upper portion of the ring-shaped preliminarily molded piece drawn out of the transferable metal die unit and a lower portion of the ring-shaped preliminarily molded piece still remaining in the transferable metal die unit in the process of drawing out the ring-shaped preliminarily molded piece from the transferable metal die unit is so small that the occurrence of cracks is prevented.

A seventh method of manufacturing a ring magnet according to the present invention is a method in which the aforementioned magnetic powder adhering to each of the aforementioned ring-shaped preliminarily molded pieces is removed halfway in the process of drawing out the aforementioned ring-shaped preliminarily molded piece from the aforementioned transferable metal die unit.

According to this method, it is possible to prevent the ring-shaped preliminarily molded piece from listing due to gaps which may occur between adjacent ring-shaped preliminarily molded pieces and from being damaged by pressurization.

An eighth method of manufacturing a ring magnet according to the present invention is a method in which the aforementioned ring-shaped preliminarily molded pieces are stacked with the aforementioned ring-shaped preliminarily molded pieces successively turned about central axes thereof in the process of stacking in multiple layers the ring-shaped preliminarily molded pieces which have been drawn out of the aforementioned transferable metal die unit in the axial direction of the aforementioned ring-shaped preliminarily molded pieces.

According to this method, it is possible to obtain a ring magnet in which ridges on the ring-shaped preliminarily molded pieces having furrows and the ridges are turned by specific skew angles from one layer to next.

Also, if there occurs a deviation of magnetic properties in a circumferential direction between one ring-shaped preliminarily molded piece and another, it is possible to cancel out this deviation of magnetic properties.

A ninth method of manufacturing a ring magnet according to the present invention is a method in which the aforementioned ring-shaped preliminarily molded pieces are stacked with top and bottom axial end faces of the aforementioned ring-shaped preliminarily molded piece at the time of molding turned upside down in at least one layer in the process of stacking in multiple layers the ring-shaped preliminarily molded pieces which have been drawn out of the aforementioned transferable metal die unit in the axial direction of the aforementioned ring-shaped preliminarily molded pieces.

According to this method, it is possible to prevent sharp changes in magnetic properties at joint areas of individual layers even when a gradient occurs in the magnetic properties of the ring-shaped preliminarily molded pieces between upper punch and lower punch sides.

BRIEF DESCRIPTION OF THE DRAWINGS

FIGS. 3(a) and 3(b) show the structure of a transferable metal die unit shown in FIG. 2, in which FIG. 3(a) is a plan view and FIG. 3(b) is a cross-sectional view taken along a line IIIb-IIIb of FIG. 3(a);

FIGS. 6(a)-6(c) are cross-sectional views for explaining the structure and working of a magnetic field-assisted molding unit;

FIGS. 7(a) and 7(b) are cross-sectional views showing the structure of a pressing element;

FIGS. 8(a)-8(d) are plan views of which FIGS. 8(a) and 8(c) cross-sectional views, FIG. 8(b) is taken along a line VIIIb-VIIIb of FIG. 8(a), and FIG. 8(d) is taken along a line VIIId-VIIId of FIG. 8(c), illustrating the structure of a back core;

FIG. 10(a) is a plan view and in FIG. 10(b) a cross-sectional view taken along a line Xb-Xb of FIG. 10(a), illustrating the structure of a mold-release unit;

FIGS. 15(a) and 15(b) are cross-sectional views for explaining the structure and working of the stacking unit;

FIGS. 16(a) and 16(b) are cross-sectional views for explaining the structure and working of the stacking unit;

FIGS. 19(a) and 19(b) are a perspective view and a cross-sectional view showing a ring-shaped molded body according to a second embodiment of the present invention;

FIGS. 23(a)-23(c) are a plan view, FIG. 22(a), and a cross-sectional view, FIG. 23(b), taken along a line XXIIIb-XXIIIb of FIG. 23(a) showing a ring-shaped preliminarily molded piece and a cross-sectional view, FIG. 23(c), showing a ring-shaped molded body according to a third embodiment of the present invention;

FIG. 24 is a cross-sectional view showing a modified form of the ring-shaped molded body of the third embodiment of this invention;

FIGS. 25(a)-25(c) are a plan view, FIG. 25(a), and a cross-sectional view, FIG. 25(b), taken along a line XVb-XVb of FIG. 25(a), showing a ring-shaped preliminarily molded piece, and a cross-sectional view, FIG. 25(c), showing a ring-shaped molded body according to a fourth embodiment of the present invention;

FIG. 26 is a cross-sectional view showing a modified form of the ring-shaped molded body of the fourth embodiment of this invention;

FIGS. 27(a)-27(c) are a plan view, FIG. 27(a), and a cross-sectional view, FIG. 27(b), taken along a line XVIIb-XVIIb of FIG. 27(a), showing a ring-shaped preliminarily molded piece and a cross-sectional view, FIG. 27(c), showing a ring-shaped molded body according to a fifth embodiment of the present invention;

FIG. 28 is a cross-sectional view showing a modified form of the ring-shaped molded body of the fifth embodiment of this invention;

FIGS. 29(a)-29(c), are a plan view, FIG. 29(a), and a cross-sectional view, FIG. 29(b), taken along a line XXIXb-XXIXb of FIG. 29(b), showing a ring-shaped preliminarily molded piece and a cross-sectional view, FIG. 29(c), showing a ring-shaped molded body according to a sixth embodiment of the present invention;

FIG. 30 is a cross-sectional view showing a modified form of the ring-shaped molded body of the sixth embodiment of this invention;

FIGS. 31(a)-31(c) are a plan view, FIG. 31(a), and a cross-sectional view, FIG. 31(b), taken along a line XXXIb-XXIb of FIG. 31(a), showing a ring-shaped preliminarily molded piece and a cross-sectional view, FIG. 31(c), showing a ring-shaped molded body according to a seventh embodiment of the present invention;

FIG. 32 is a cross-sectional view showing a modified form of the ring-shaped molded body of the seventh embodiment of this invention;

FIGS. 33(a)-33(c) are a plan view, FIG. 33(a), and a side view, FIG. 33(b), showing a ring-shaped preliminarily molded piece and a side view, FIG. 33(c), showing a ring-shaped molded body according to an eighth embodiment of the present invention;

FIG. 34 is a side view showing a modified form of the ring-shaped molded body of the eighth embodiment of this invention;

FIGS. 35(a)-35(c) are a plan view, FIG. 35(a), and a side view, FIG. 35(b), showing a ring-shaped preliminarily molded piece and a side view, FIG. 35(c), showing a ring-shaped molded body according to a ninth embodiment of the present invention;

FIG. 36 is a side view showing a modified form of the ring-shaped molded body of the ninth embodiment of this invention;

FIGS. 37(a)-37(d) are a plan view, FIG. 37(a) and three side views, FIGS. 37(b)-37(d), showing a ring-shaped preliminarily molded piece and a ring-shaped molded body according to a tenth embodiment of the present invention;

FIG. 38 is a side view showing a modified form of the ring-shaped molded body of the tenth embodiment of this invention;

FIGS. 39(a)-39(d) are a plan view, and three side views, showing a ring-shaped preliminarily molded piece and showing a ring-shaped molded body according to an eleventh embodiment of the present invention; and FIG. 40 is a side view showing a modified form of the ring-shaped molded body of the eleventh embodiment of this invention.

BEST MODES FOR CARRYING OUT THE INVENTION

Individual embodiments of the present invention are now described in the following based on the drawings.

First Embodiment

Figures 1A, 1B:
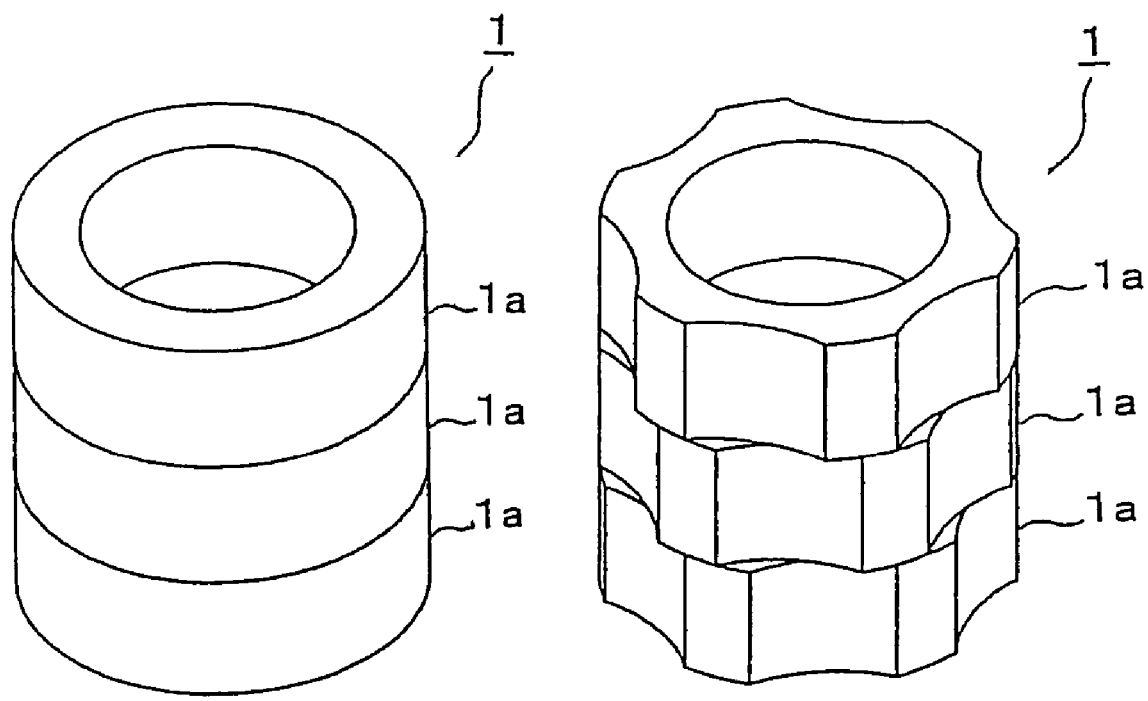
FIGS. 1(a) and 1(b) are perspective views showing examples of ring magnets obtained by forming and sintering the same by a permanent magnet molding apparatus of the present invention.
Figure 2:
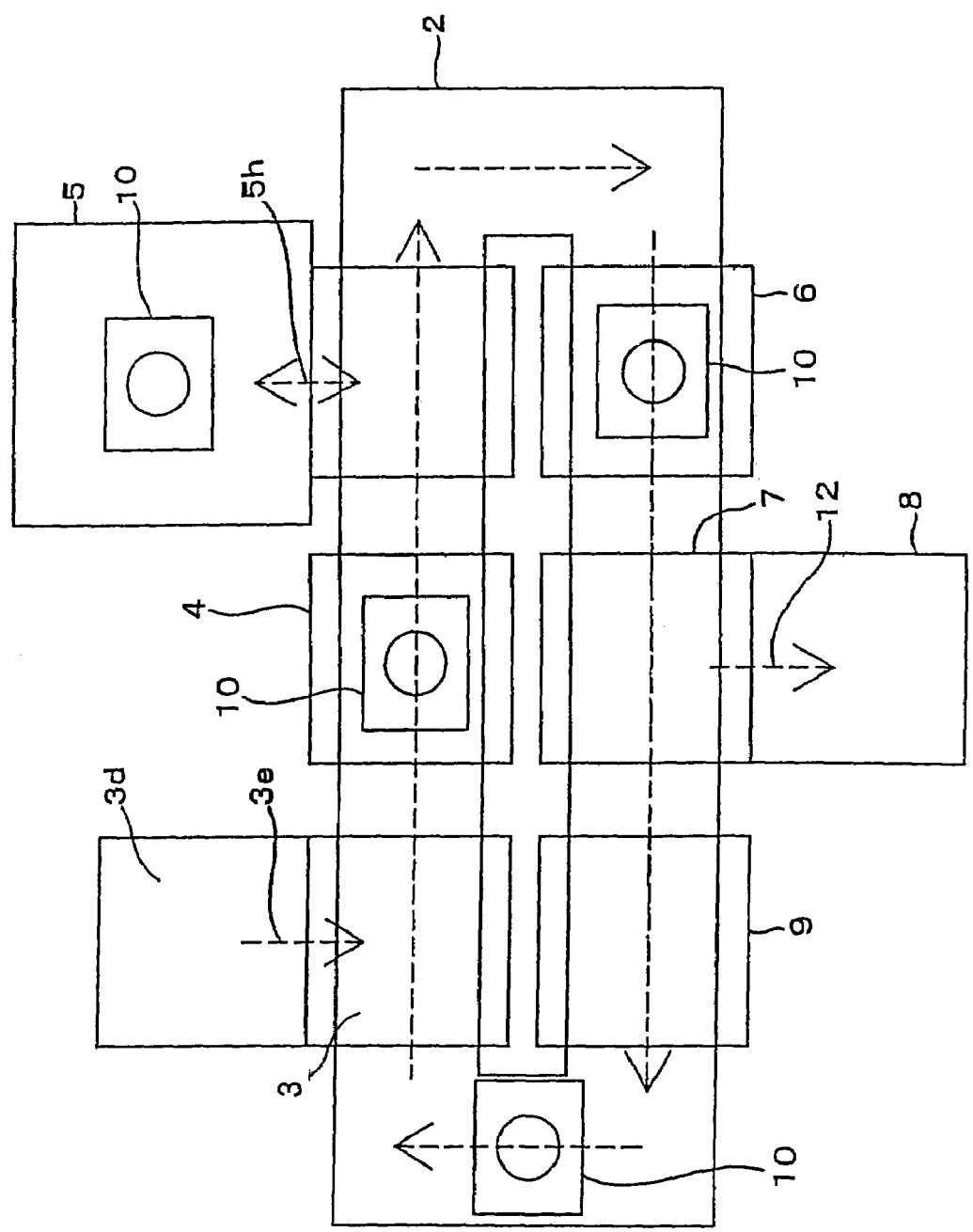
FIG. 2 is a plan view showing the structure of a magnet molding apparatus according to a first embodiment of this invention.
Figure 3A:
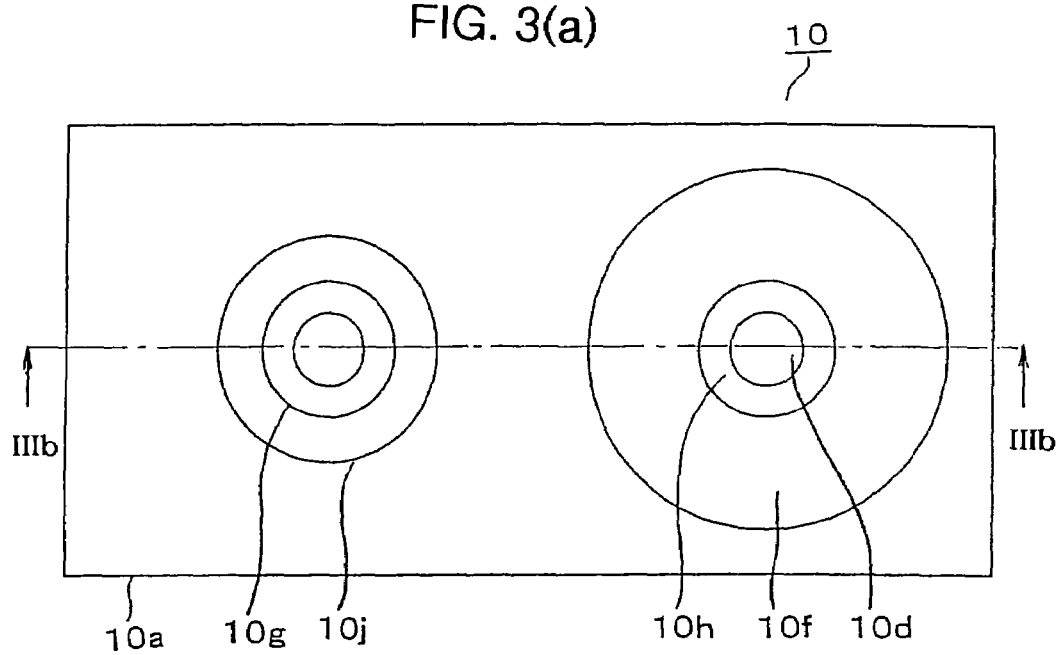
Figure 3B:
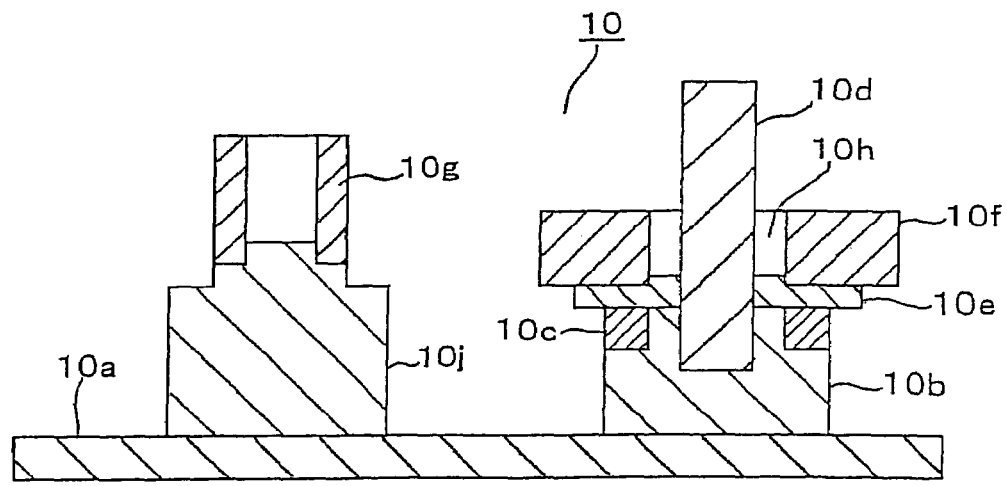

FIGS. 1(a) and 1(b) are perspective views showing examples of ring magnets obtained by forming and sintering the same by a method of manufacturing the ring magnets of the present invention, FIG. 2 is a plan view showing the structure of a magnet molding apparatus used for carrying out the method of manufacturing the ring magnets according to a first embodiment of the present invention, and FIGS. 3(a) and 3(b) show the structure of a transferable metal die unit shown in FIG. 2. FIG. 3(a) is a plan view and FIG. 3(b) is a cross-sectional view taken along line IIIb-IIIb of FIG. 3(a).

As illustrated in FIGS. 1(a) and 1(b), a ring magnet 1 molded and manufactured by the magnet molding apparatus of this invention is a product obtained by stacking and sintering preliminarily molded ring pieces 1a each formed into a cylindrical shape as shown in FIG. 1(a) or by stacking and sintering ring-shaped preliminarily molded pieces 1a each having furrows and ridges on a curved peripheral surface as shown in FIG. 1(b). (Although furrows and ridges are formed on a curved outer surface in the Figure, the ring-shaped preliminarily molded pieces 1a include those having furrows and ridges also on a curved inner surface.)

The ring magnet 1 thus produced by stacking and sintering the ring-shaped preliminarily molded pieces 1a each having a short axial length is less susceptible to deterioration of magnetic properties in boundary regions between the adjacent ring-shaped preliminarily molded pieces 1a. It is therefore possible to produce the ring magnet 1 having a large total amount of magnetic flux.

As illustrated in FIG. 2, the magnet molding apparatus of this embodiment includes a belt conveyor 2 for transferring the transferable metal die unit 10, a powder feeding/filling unit 3 for weighing magnetic powder and feeding and filling the same into a ring-shaped cavity in the transferable metal die unit 10, a punch setup unit 4 for setting an upper punch in a condition where the upper punch for pressurizing the magnetic powder filled in the cavity in the transferable metal die unit 10, in which the magnetic powder has been filled, can form the magnetic powder by pressure molding, a magnetic field-assisted molding unit 5 for pressure-molding in a magnetic field the magnetic powder in the transferable metal die unit 10 which has reached a condition in which the magnetic powder can undergo pressure molding with the upper punch set in position, a mold-release unit 6 for drawing a ring-shaped preliminarily molded piece which has been pressure-molded in the magnetic field out of the transferable metal die unit 10, a molded piece powder removal unit 7 for removing excess magnetic powder adhering to the ring-shaped preliminarily molded piece which has been drawn out, a stacking unit 8 for stacking ring-shaped preliminarily molded pieces which have been pressure-molded in the magnetic field, and a die powder removal/setup unit 9 for removing the magnetic powder adhering to the transferable metal die unit 10 and placing the transferable metal die unit 10 in a transferable condition.

As shown in FIGS. 3(a) and 3(b), the transferable metal die unit 10 includes a palette 10a which travels on the belt conveyor 2, a holder (first holder) 10b, 10c for holding a lower metal die portion including a columnlike core 10d, a lower punch 10e and a die 10f with the core 10d disposed at the center of the die 10f, the lower punch 10e and the core 10d together forming a cavity 10h into which the magnetic powder is supplied, and an upper punch 10g held by another holder (second holder) 10j. The holder 10b is an element made of ferromagnetic material while the holder 10c is an element made of nonmagnetic material.

Mounting positions and directions of the palette 10a and the holders 10b, 10j, the holder 10b and the lower punch 10e, and the lower punch 10e and the die 10f are restricted by respective positioning pins which constitute positioning mechanisms.

The provision of these positioning mechanisms serves to facilitate setup of metal die components (e.g., insertion into the core and the die into the upper die) on the palette and positioning of the transferable metal die unit 10 when it is transferred onto the magnetic field-assisted molding unit 5.

The structure and working of each unit are now explained in the following with reference to FIG. 2.

First, the transferable metal die unit 10 is transferred onto the powder feeding/filling unit 3 by the belt conveyor 2.

Figure 4A:
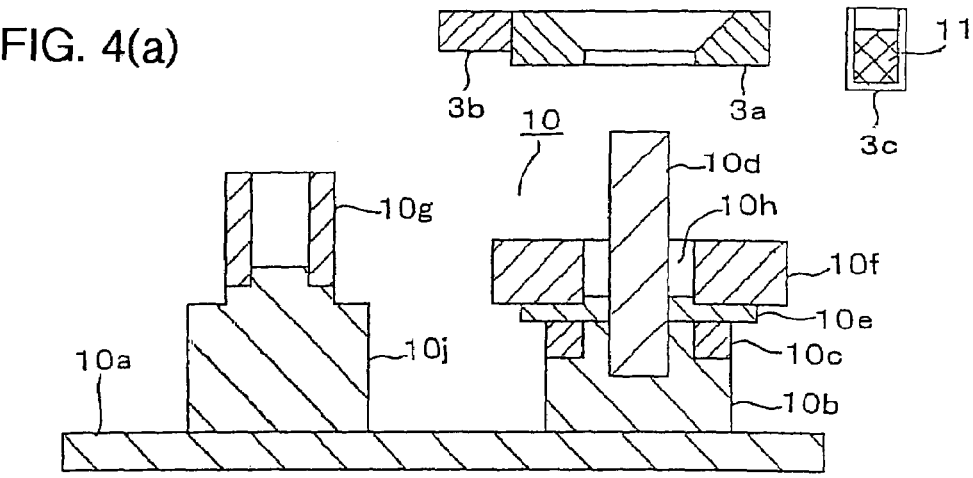
FIGS. 4(a)-4(c) are cross-sectional views for explaining a powder feeding/filling unit and the working thereof.
Figure 4B:
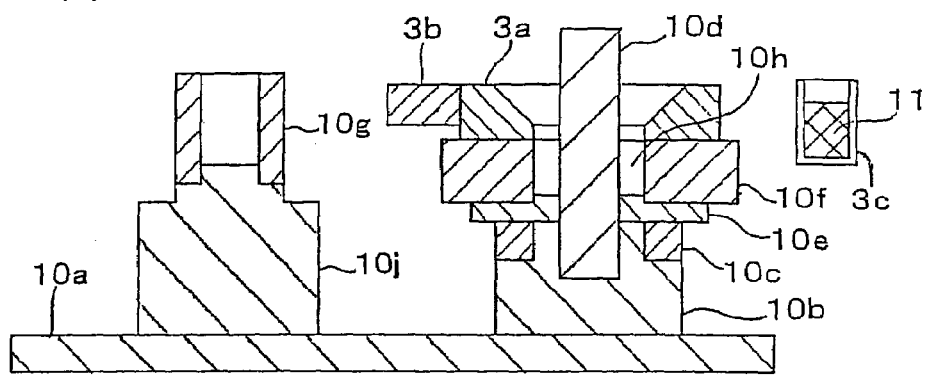
Figure 4C:
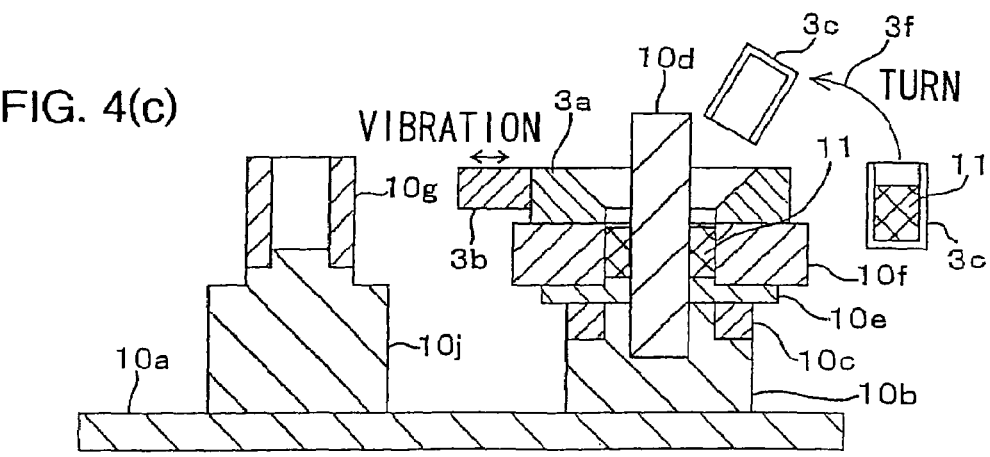

FIGS. 4(a)-4(c) are cross-sectional views for explaining the powder feeding/filling unit and the working thereof, in which shown in FIG. 4(a) is a process of weighing the magnetic powder and shown in FIGS. 4(b) and 4(c) is a process of feeding the magnetic powder into the transferable metal die unit 10.

The powder feeding/filling unit 3 includes, as shown in FIG. 2, a weighing mechanism 3d for weighing the magnetic powder and a transport mechanism 3e for transferring the magnetic powder 11 weighed and picked up into a vessel 3c to the position of the transferable metal die unit 10. Also, as shown in FIGS. 4(a)-4(c), the powder feeding/filling unit includes a turning mechanism 3f for turning the vessel 3c to a slant angle, a powder feeding jig 3a for guiding the magnetic powder 11 in the vessel 3c into the cavity 10h and a vibrating mechanism 3b including a vibrator element for vibrating the powder feeding jig 3a.

When the transferable metal die unit 10 has been transferred up to the powder feeding/filling unit, the powder feeding/filling unit places the magnetic powder 11 into the vessel 3c while measuring a specific weight of the magnetic powder 11 by using a vibration feeder and a weighing instrument in the magnetic powder weighing process shown in FIG. 4(a).

By weighing the magnetic powder to be accommodated in the vessel 3c as discussed above, it is possible to maintain the height of ring-shaped molded pieces to be formed constant and prevent damages in a stacking process as will be later described.

In the powder feeding process shown in FIGS. 4(b) and 4(c), the powder feeding jig 3a having a funnellike shape for guiding the magnetic powder 11 into the cavity 10h of the transferable metal die unit 10 and a winglike jig (not shown) for stirring the magnetic powder fed into the cavity 10h are set on the die 10f of the transferable metal die unit 10 and, then, the vessel 3c accommodating the magnetic powder 11 is moved up the position of the funnellike powder feeding jig 3a, the powder feeding jig 3a is turned to a slant angle, and the magnetic powder 11 in the vessel 3c is transferred into the funnellike powder feeding jig 3a. Further, an impact is given to the vessel 3c by means of a knocker to transfer the magnetic powder 11 in the vessel 3c into the funnellike powder feeding jig 3a without leaving any magnetic powder 11 in the vessel 3c. Further, the entirety of the magnetic powder on the powder feeding jig 3a is transferred into the cavity 10h by giving vibrations to the funnellike powder feeding jig 3a by the vibrating mechanism 3b and the magnetic powder 11 is uniformly filled in the cavity by lifting wings of the winglike jig while rotating the wings to mix the magnetic powder 11 in the cavity 10h.

As the magnetic powder 11 is filled in the cavity by lifting the wings of the winglike jig while rotating the wings to mix the magnetic powder 11 in the cavity, any voids or bridges of the magnetic powder present in the magnetic powder in the cavity are collapsed and the magnetic powder is uniformly filled in the cavity.

The transferable metal die unit filled with the magnetic powder is transferred to the punch setup unit 4 and set in place at a prescribed position.

FIGS. 5(a)-5(d) are cross-sectional views for explaining the structure and working of the punch setup unit. As shown in these figures, the punch setup unit includes a tong-grip lifter 4a for catching the upper punch 10g and a transfer mechanism for raising and lowering the tong-grip lifter 4a and moving the upper punch 10g caught by the tong-grip lifter 4a.

With this punch setup unit, it is possible to set the transferable metal die unit in a condition where the magnetic powder in the cavity can be pressurized by the upper punch 10g.

Since the transferable metal die unit 10 is set in the condition where the magnetic powder can be pressurized by inserting the upper punch 10g into the cavity, there is no need for a mechanism for positioning individual parts of the transferable metal die unit 10 with high precision for magnetizing pressure molding in a succeeding process.

Figure 5A:
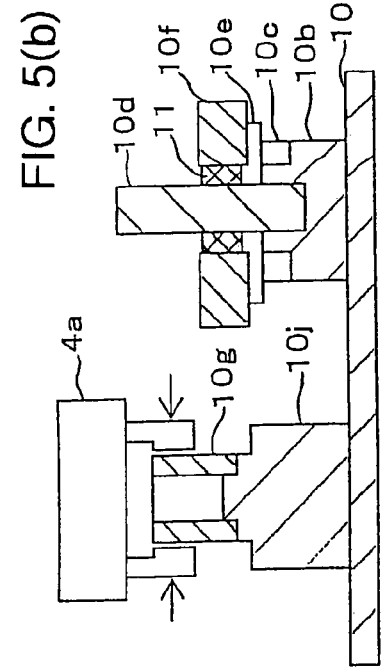
FIGS. 5(a)-5(d) are cross-sectional views for explaining the structure and working of a punch setup unit.
Figure 5B:
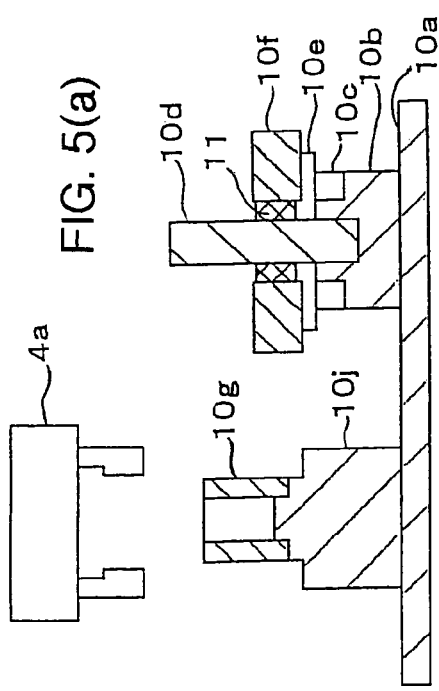
Figure 5C:
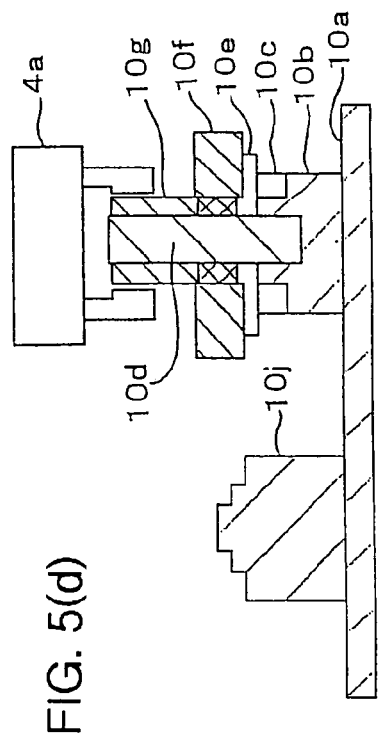
Figure 5D:
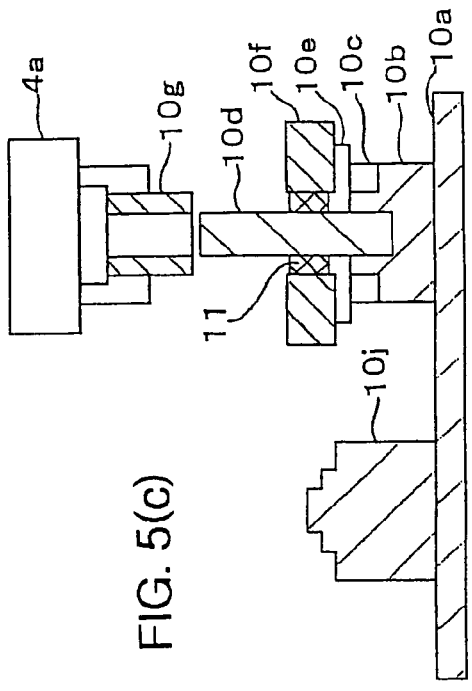

When the palette 10a has been transferred onto a stage of the punch setup unit 4 and set in place at the prescribed position as shown in FIG. 5(a), the tong-grip lifter 4a descends and catches the upper punch log as shown in FIG. 5(b). The tong-grip lifter 4a then lifts the upper punch 10g as shown in FIG. 5(c), moves toward a lower die section and descends to fit the upper punch 10g on the core 10d as shown in FIG. 5(d). Subsequently, the tong-grip lifter 4a releases the upper punch 10g and the upper punch 10g fits into the cavity. The diameter of an upper end portion of the core 10d is made smaller than the inside diameter of the cavity by 0.2 mm and tapered by 3°. Therefore, even if the positions of the palette and the tong-grip lifter 4a are offset from each other by an amount not exceeding 0.1 mm at the time of punch insertion, there occurs no such a failure that the punch 10g can not be fitted over the core 10d. Then, after releasing the upper punch 10g, the tong-grip lifter 4a ascends and moves back to its original position.

The transferable metal die unit 10 on which the upper punch 10g has been set is transported to a specified position of the magnetic field-assisted molding unit 5 by the belt conveyor 2.

FIGS. 6(a)-6(c) are cross-sectional views for explaining the structure and working of the magnetic field-assisted molding unit. FIGS. 7(a) and 7(b) are cross-sectional views showing the structure of a pressing element, and FIGS. 8(a)-8(d) are plan views, FIG. 8(a) and FIG. 8(c) are cross-sectional views FIG. 8(b) and FIG. 8(d) being taken along lines VIIIb-VIIIb and VIIId-VIIId, illustrating the structure of a back core. As shown in FIG. 2, the magnetic field-assisted molding unit 5 has a transfer mechanism 5h for transferring a metal die portion of the transferable metal die unit 10 on which the upper punch 10g has been set from the pallet 10a on the belt conveyor 2 to the magnetic field-assisted molding unit 5 and returning the metal die portion of the transferable metal die unit 10 onto the pallet 10a on the belt conveyor 2 after magnetization molding. As shown in FIGS. 6(a)-6(c), the magnetic field-assisted-molding unit 5 is provided with electromagnetic coils 5a (fixed to frames) for generating an orienting magnetic field for magnetically orienting the magnetic powder, a compression molding mechanism 5b for raising and lowering the pressing element 5c for pressing the top-side electromagnetic coil 5a and the upper punch 10g, a ring-shaped elastic member 5j and back yokes 5d which go into contact with the die 10f when actuated by an unillustrated air cylinder.

As shown in FIGS. 7(a) and 7(b), the pressing element 5c is provided with a punch pressing portion 5e for pressing the upper punch, a movable rod 5f which moves as if pushed into the interior of the punch pressing portion 5e, a spring 5g located between a rear surface of the movable rod 5f and an inner surface of the punch pressing portion 5e for pressing the movable rod 5f against the core 10d.

Also, the back yokes 5d constitute one ferromagnetic member having a semicircular opening which fits on the outside diameter of the die 10f as shown in FIG. 8. The back yokes 5d disposed such that the center of their thickness coincides with the central position of the thickness of the die 10f, moves in the direction of the die 10f and goes into contact therewith.

When the transferable metal die unit 10 has been transferred from the punch setup unit 4 to the magnetic field-assisted molding unit 5 by the belt conveyor 2, the metal die-portion is transferred from the palette 10a to a molding portion of the magnetic field-assisted molding unit 5 together with the holder 10b by the transfer mechanism 5h (refer to FIG. 2) as shown in FIG. 6(a).

Next, as the compression molding mechanism 5b is actuated, the electromagnetic coil 5a and the pressing element descend, the top- and bottom-side frames are fixed to each other by a clamping function and the die 10f is fixed by the ring-shaped elastic member 5j which is attached to the bottom of the top-side frame as shown in FIG. 6(b). Then, the back yokes 5d move from both sides of the die 10f and go into tight contact with the outer periphery of the die 10f. Subsequently, a current is caused to flow through the electromagnetic coil 5a, generating a radially orienting magnetic field, the pressing element 5c descends to press the upper punch 5g (sic), and the upper punch 5g (sic) compression-molds the magnetic powder in the cavity as shown in FIG. 6(c), whereby a radially oriented molded piece is obtained. Compression molding pressure should be 10 to 100 MPa, preferably 10 MPa, and orienting magnetic field should be made equal to or higher than 1T.

Figure 9:
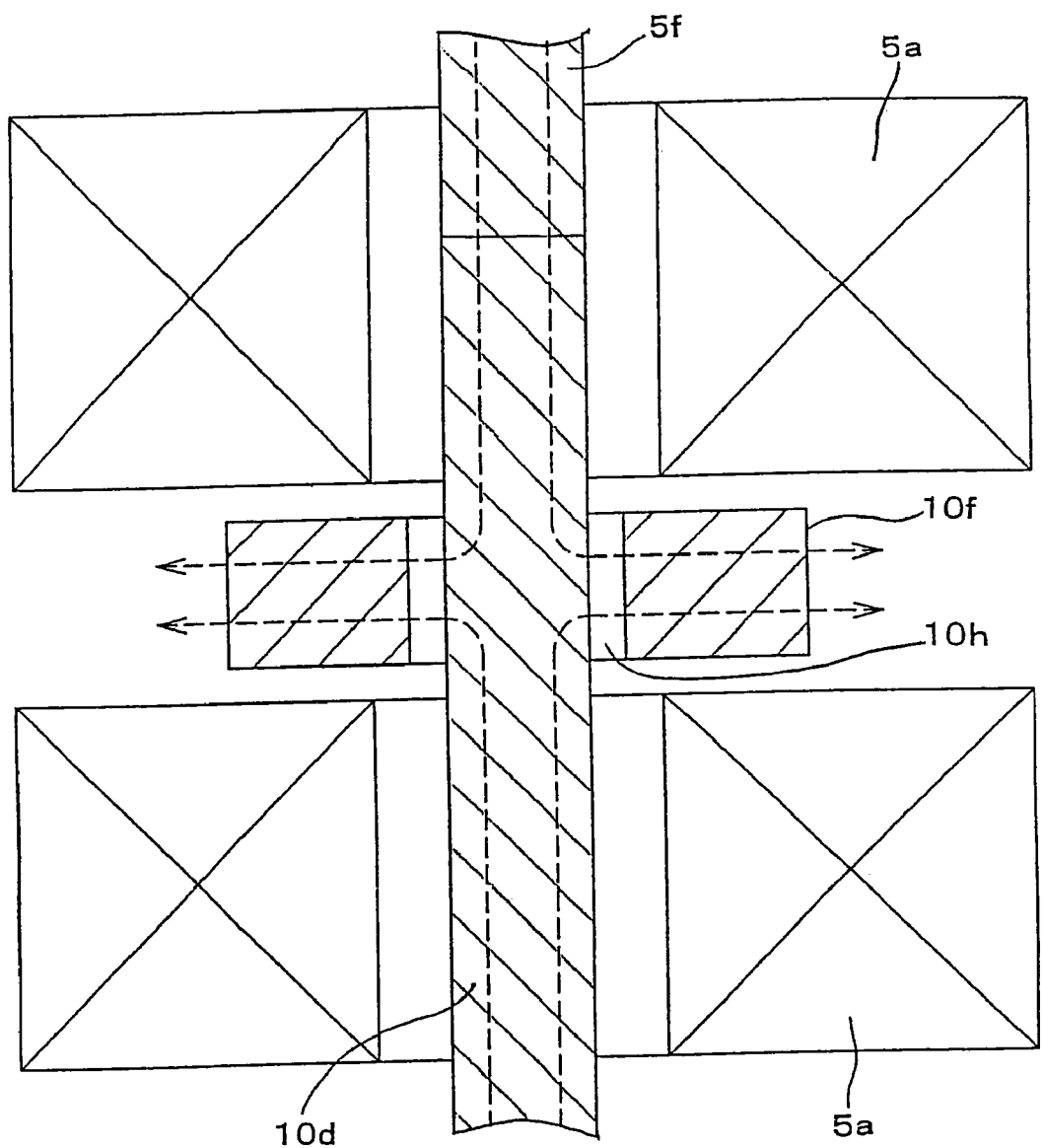
FIG. 9 is a cross-sectional view showing a state of magnetic fluxes during radial magnetic orientation.

FIG. 9 is a cross-sectional view showing a state of magnetic fluxes during radial magnetic orientation. A magnetic field generated by the top-side coil 5a passes through the pressing element 5c which is a ferromagnetic member in the form of a magnetic flux and enters the movable rod 5f which is also a ferromagnetic member, whereas a magnetic field generated by the bottom-side coil 5a passes through the holder 10b which is a ferromagnetic member and enters the core 10d (refer to FIG. 6). The lower punch 10e and the upper punch 10g are nonmagnetic members.

As shown in FIG. 9, the magnetic fluxes indicated by arrows with broken lines pass through the movable rod 5f which is a ferromagnetic member and the core 10d and pass through the cavity 10h of the die 10f which is the ferromagnetic member in radial directions thereof, creating thereby a radially orienting magnetic field inside the cavity 10h.

A radially oriented ring-shaped preliminarily molded piece is returned onto the palette 10a together with the metal die portion and the holder 10b by the transfer mechanism 5h.

The transferable metal die unit including the ring-shaped preliminarily molded piece is transported to a specified position on the mold-release unit 6 by the belt conveyor 2.

FIGS. 10(a) and 10(b) are a plan view FIG. 10(a), and a cross-sectional view, FIG. 10(b), taken along a line Xb-Xb of FIG. 10(a), illustrating the structure of the mold-release unit. As shown in this Figure, the mold-release unit is provided with a molded piece pressurization mechanism including an air cylinder 6a for pressurizing each ring-shaped preliminarily molded piece 13 and an upper punch stopper 6d, and a die lifting mechanism including a table 6c for lifting the die 10f upward and an air cylinder 6b.

Figure 11A:
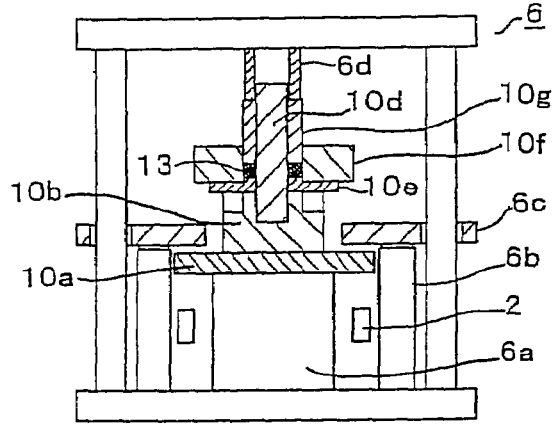
FIGS. 11(a)-11(d) are cross-sectional views for explaining the working of the mold-release unit.

FIGS. 11(a)-11(d) are cross-sectional views for explaining the working of the mold-release unit. As the air cylinder 6a lifts up the pallet 10a as shown in FIG. 11(a), the upper punch 10g goes in contact with the upper punch stopper 6d so that the ring-shaped preliminarily molded piece 13 is pressurized. Pressurizing force should be 0.1 to 1 MPa.

Figure 11B:
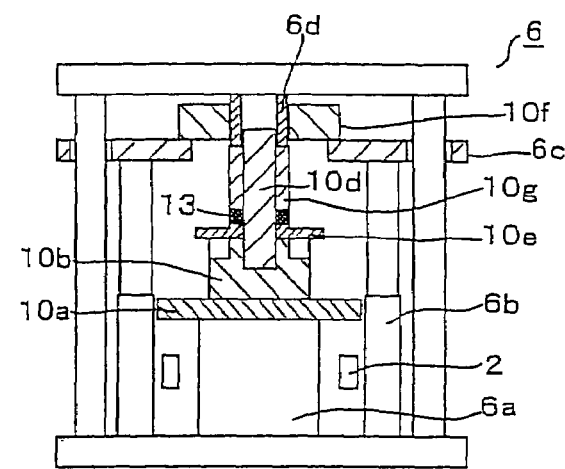

Next, as shown in FIG. 11(b), the air cylinder 6b is actuated, the table 6c lifts up the die 10f and the ring-shaped preliminarily molded piece 13 is drawn out of the die 10f.

Figure 11C:
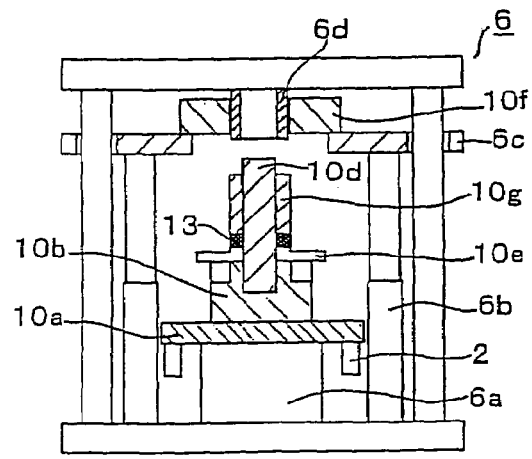
Figure 11D:
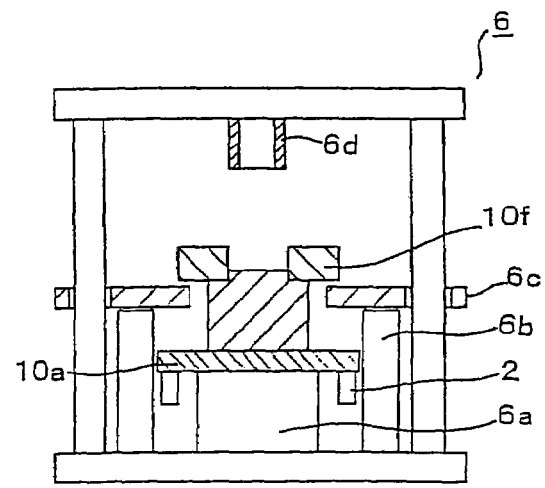

Next, as shown in FIG. 11(c), the air cylinder 6a lowers and the pallet 10a lies on the belt conveyor 2. Carried by the belt conveyor 2, the pallet 10a moves up to a position where the die 10f is loaded on another holder 10j placed on the pallet 10a when the die 10f supported by the table 6c descends, and the table pressing cylinder 6b is actuated so that the table 6c descends, thereby placing the die 10f on the holder 10j as shown in FIG. 11(d).

If there is a difference in internal stresses between an upper portion of the ring-shaped preliminarily molded piece 13 drawn out of the transferable metal die unit 10 and a lower portion of the ring-shaped preliminarily molded piece 13 still remaining in the transferable metal die unit 10 in the process of drawing out the ring-shaped preliminarily molded piece 13 from the transferable metal die unit 10, cracks are likely to develop. In this mold-release unit, however, the molded piece 13 is drawn out of the die 10f under conditions where the ring-shaped preliminarily molded piece 13 is pressurized, and the difference in internal stress between a top surface and a bottom surface of the ring-shaped preliminarily molded piece 13 is so small that the occurrence of cracks is prevented.

After the die 10f has been drawn out, the transferable metal die unit 10 is transported to a specified position of the molded piece powder removal unit 7 by the belt conveyor 2.

FIGS. 12(a), 12(b), 13(a), and 13(b) are cross-sectional views for explaining the structure and working of the molded piece powder removal unit. As shown in these Figures, the molded piece powder removal unit is provided with a raise/lower mechanism including a table 7a and an air cylinder 7b for raising and lowering the table 7a, a nozzle 7c for spewing out nitrogen gas and a dust collecting duct 7d for drawing and collecting the magnetic powder into a dust collector.

Figure 12B:
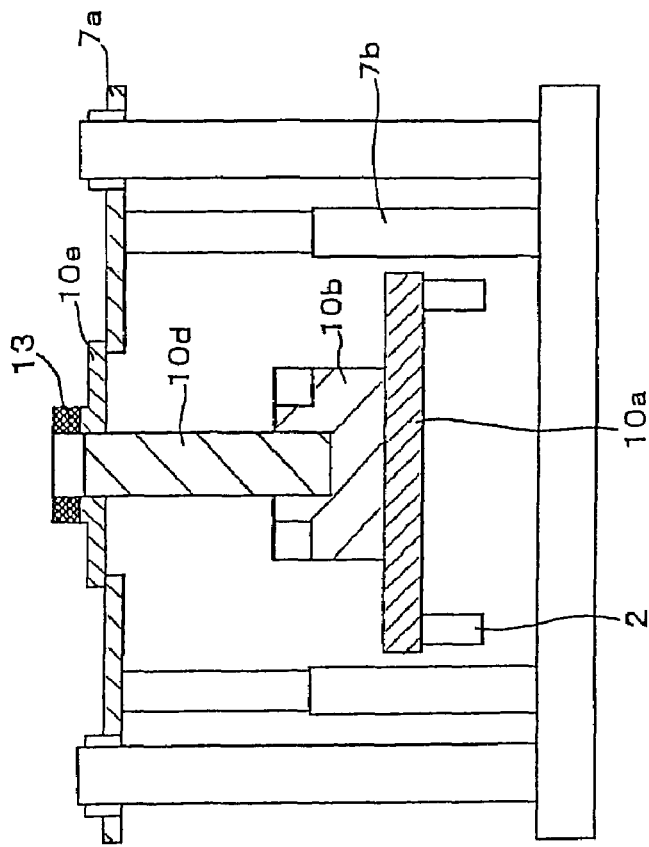
FIGS. 12(a) and 12(b) are cross-sectional views for explaining the structure and working of a molded piece powder removal unit.
Figure 12A:
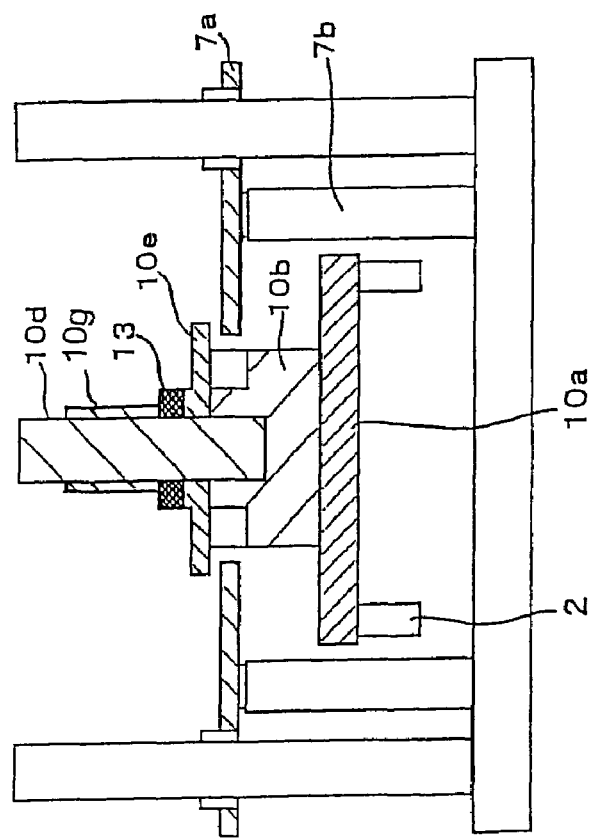

As shown in FIG. 12(a), the pallet 10a halts at the specified position, the air cylinder 7b is actuated and the table 7a ascends. Then, as shown in FIG. 12(b), the lower punch 10e ascends, supported by the table 7a, and the ring-shaped preliminarily molded piece 13 is drawn apart from the core 10d. At this time, the upper punch 10g is drawn out simultaneously and placed on another holder 10j (refer to FIG. 3).

Figure 13A:
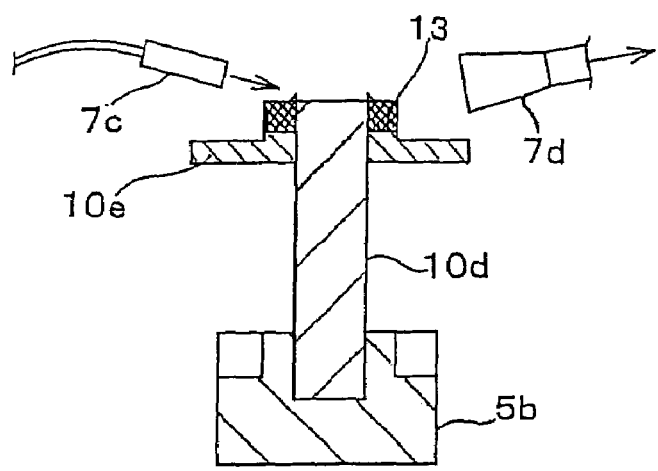
FIGS. 13(a) and 13(b) are cross-sectional views for explaining the structure and working of the molded piece powder removal unit.
Figure 13B:
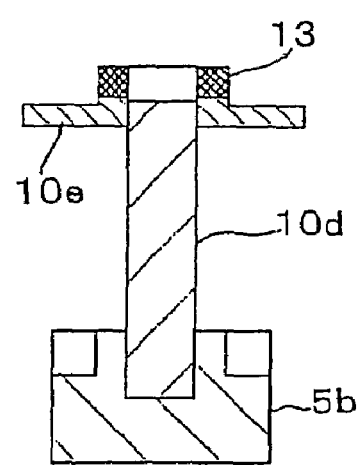

When the top surface of the ring-shaped preliminarily molded piece 13 has slightly protruded beyond the core 10d in the process of drawing out the ring-shaped preliminarily molded piece 13 from the core 10d, nitrogen gas is spewed out from the nozzle 7c to blow out the magnetic powder adhering to the surface of the ring-shaped preliminarily molded piece 13 and the magnetic powder is sucked up by the dust collecting duct 7d as shown in FIG. 13(a). Subsequently, the ring-shaped preliminarily molded piece 13 is drawn out from the core 10d as shown in FIG. 13(b).

By removing excess magnetic powder from the ring-shaped preliminarily molded piece 13 by the molded piece powder removal unit 7, it is possible to prevent the ring-shaped preliminarily molded piece 13 from listing due to gaps which may occur between adjacent ring-shaped preliminarily molded pieces 13 and from being damaged by pressurization during stacking in a succeeding process.

After the powder removal process, the ring-shaped preliminarily molded piece 13 is transferred together with the holder 10b, the core 10d and the lower punch to the stacking unit 8 by a transfer mechanism 12.

FIGS. 14(a), 14(b), 15(a), 15(b), and 16(a), 16(b) are cross-sectional views for explaining the structure and working of the stacking unit. As shown in these Figures, the stacking unit is provided with a tong-grip lifter 8a serving as a mechanism for gripping the ring-shaped preliminarily molded piece 13, a table 8b on which ring-shaped preliminarily molded pieces 13 are stacked, a mechanism for positioning, raising, lowering and moving the tong-grip lifter 8a and a turning mechanism, such as a motor, for turning the table 8b although the latter two mechanisms are not illustrated.

Figure 14B:
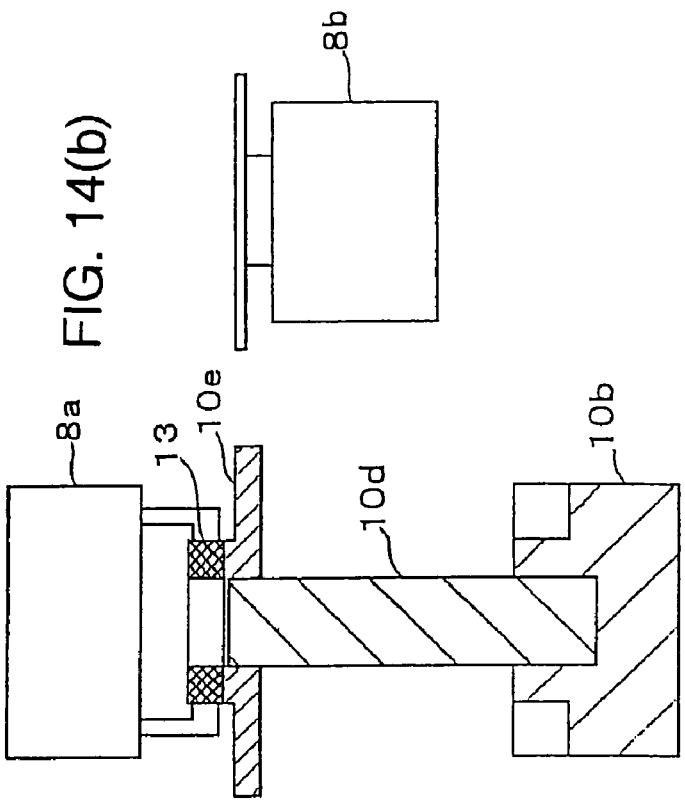
FIGS. 14(a) and 14(b) are cross-sectional views for explaining the structure and working of a stacking unit.
Figure 14A:
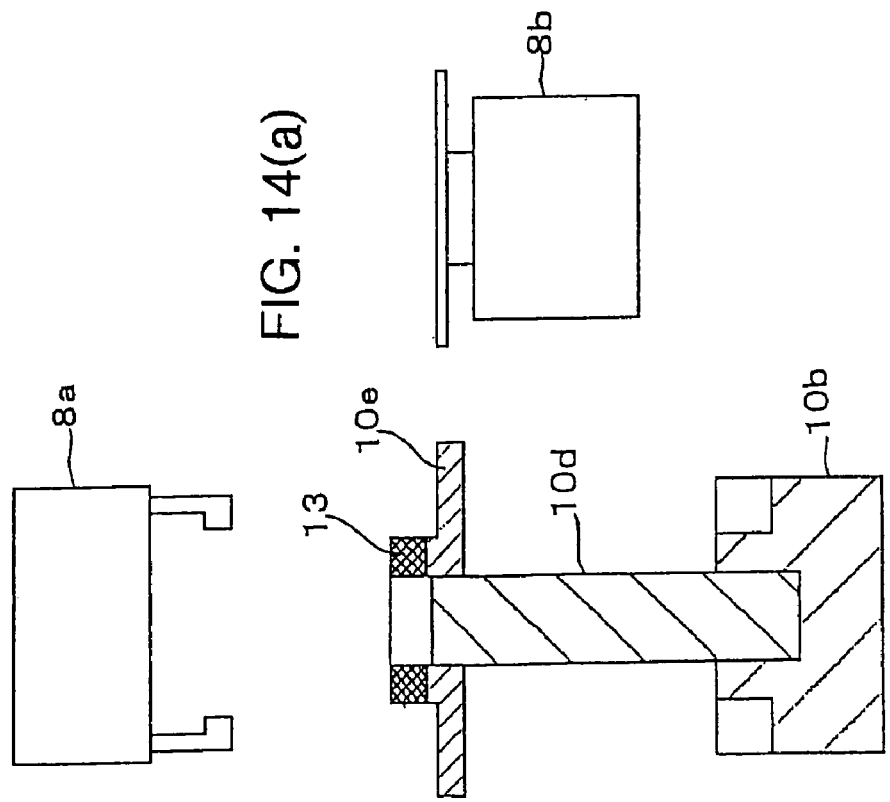
Figure 17A:
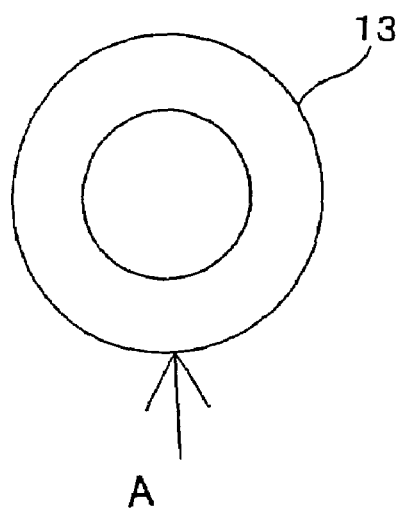
FIGS. 17(a)-17(d) are diagrams showing a process of stacking molded pieces in such a manner that the molded pieces in individual layers are skewed by desired angles.
Figure 17B:
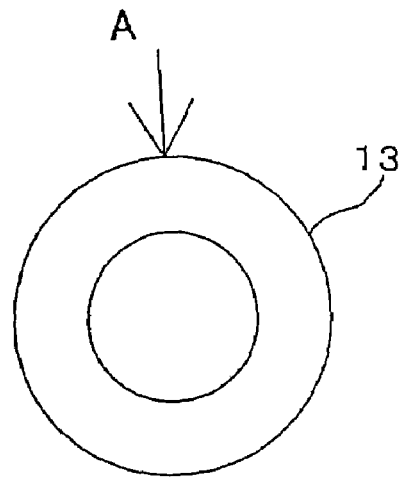
Figure 17C:
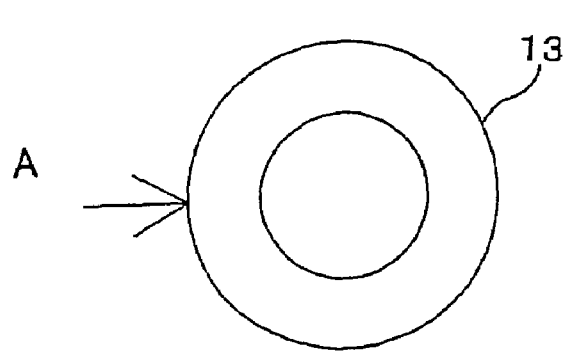
Figure 17D:
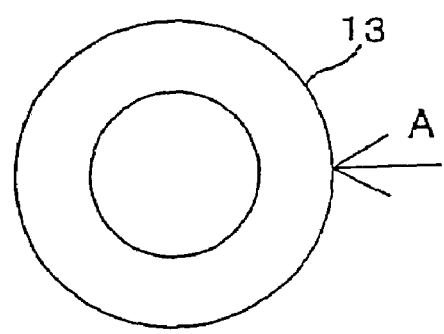

As shown in FIG. 14(a), the tong-grip lifter 8a is moved to a location just above the ring-shaped preliminarily molded piece 13 drawn from the core 10d. Then, as shown in FIG. 14(b), the tong-grip lifter 8a is lowered to grip the ring-shaped preliminarily molded piece 13. Gripping force is adjusted to 0.1 to 4N.

Next, the tong-grip lifter 8a is raised and, as shown in FIG. 15(a), the tong-grip lifter 8a is moved such that its center is located exactly above the center of rotation of the table 8b. Then, as shown in FIG. 15(b), the tong-grip lifter 8a is lowered and the ring-shaped preliminarily molded piece 13 is placed on the table 8b. At this time, the center of the ring-shaped preliminarily molded piece 13 coincides with the center of rotation of the table 8b.

Further, using the same procedure, ring-shaped preliminarily molded pieces 13 in second and third layers are stacked on top of the ring-shaped preliminarily molded piece 13 in a first layer as shown in FIGS. 16(*a*) and 16(*b*). Ring-shaped preliminarily molded pieces 13 are stacked up to a necessary number of layers by repeating this stacking process.

If the height of the stacked ring-shaped preliminarily molded pieces 13 becomes too large due to the occurrence of variations in height among the individual ring-shaped preliminarily molded pieces 13, undesirable pressure will be exerted on the ring-shaped preliminarily molded pieces 13 during the stacking process, potentially causing crushing of the ring-shaped preliminarily molded pieces 13. If the height of the stacked ring-shaped preliminarily molded pieces 13 becomes too small, the tong-grip lifter 8*a* may release the ring-shaped preliminarily molded piece 13 in the air, potentially causing breakage of the ring-shaped preliminarily molded piece 13 as a result of an impact of fall. In the present embodiment, however, the weight of the ring-shaped preliminarily molded piece 13 molded in one cycle is measured to a fixed amount in the magnetic powder weighing process carried out by the powder feeding/filling unit 3 shown in FIG. 2, so that the height of each ring-shaped preliminarily molded piece 13 is kept constant and there will not arise such a problem that an undesirable force or an impact force is exerted on the ring-shaped preliminarily molded piece 13 during the stacking process.

FIGS. 17(*a*)-17(*d*) are diagrams showing a process of stacking ring-shaped preliminarily molded pieces 13 in such a manner that the ring-shaped preliminarily molded pieces 13 in individual layers are turned, or skewed, by desired angles. For example, the ring-shaped preliminarily molded piece 13 of the first layer is placed on the table 8*b* such that a position A of the ring-shaped preliminarily molded piece 13 is located as shown in FIG. 17(*a*). Then, the table 8*b* is turned by 180° such that the position A of the ring-shaped preliminarily molded piece 13 is located as shown in FIG. 17(*b*), and the ring-shaped preliminarily molded piece 13 of the second layer is stacked. The ring-shaped preliminarily molded piece 13 of the third layer is stacked after further turning the table 8*b* by 90° as shown in FIG. 17(*c*), and the ring-shaped preliminarily molded piece 13 of the fourth layer is stacked after further turning the table 8*b* by 180° as shown in FIG. 17(*d*).

By stacking the ring-shaped preliminarily molded pieces 13 in the individual layers in a manner that the preliminarily molded pieces 13 are skewed by desired angles as mentioned above, it is possible to obtain a ring magnet in which ridges on the ring-shaped preliminarily molded pieces 1*a* having furrows and ridges are turned by specific skew angles from one layer to next as shown in FIG. 1(*b*), for example.

Also, if there occurs a deviation of magnetic properties in a circumferential direction between one ring-shaped preliminarily molded piece 13 and another, it is possible to cancel out this deviation of magnetic properties.

Figure 18:
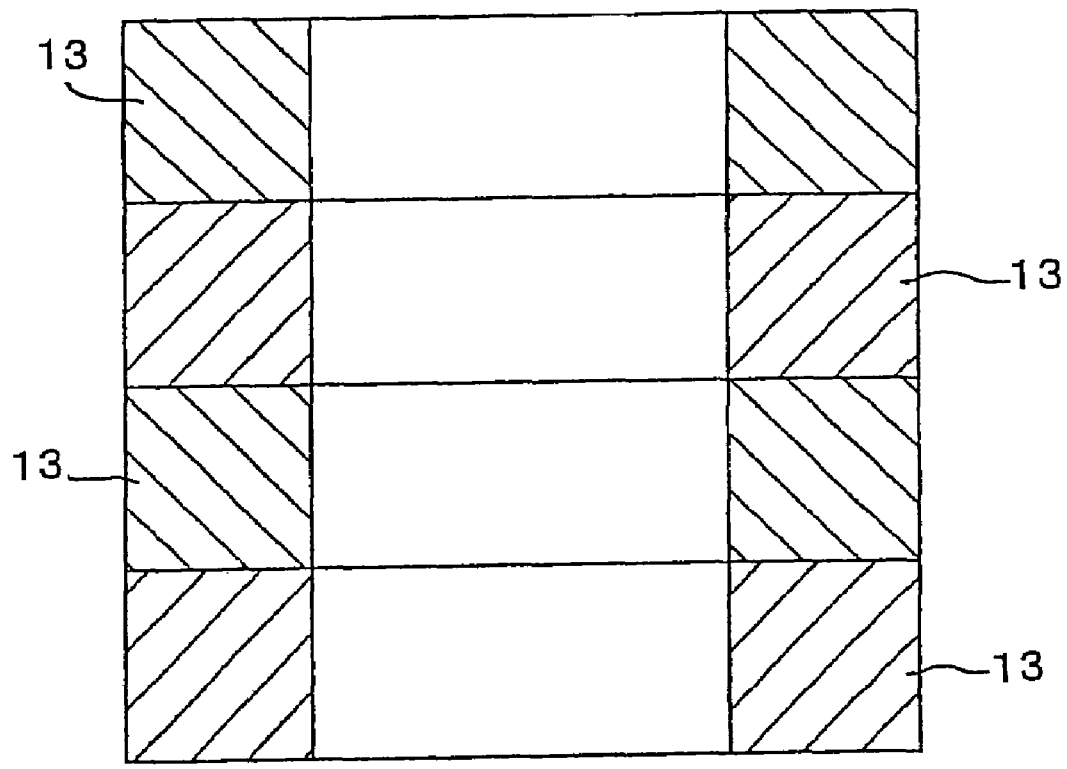
FIG. 18 is a cross-sectional view showing a state in which the ring-shaped preliminarily molded pieces are stacked in such a manner that axial end faces of the ring-shaped preliminarily molded piece are turned upside down.

FIG. 18 is a cross-sectional view showing a state in which the ring-shaped preliminarily molded pieces are stacked in such a manner that axial end faces of the ring-shaped preliminarily molded piece of every other layer at the time of molding are turned upside down. In certain cases, a gradient could occur in the magnetic properties of the ring-shaped preliminarily molded pieces 13 between the upper punch side and the lower punch side, causing sharp changes in magnetic properties at joint areas of the individual layers, for example. It is however possible to prevent such sharp changes in magnetic properties at the joint areas of the individual layers by placing the ring-shaped preliminarily molded piece 13 of the first layer with its axial end faces turned upside down such that the bottom face is the upper punch side, stacking the ring-shaped preliminarily molded piece 13 of the second layer without turning its axial end faces upside down such that the bottom face becomes the lower punch side, and so on, by alternately stacking the ring-shaped preliminarily molded piece 13 turned upside down and the ring-shaped preliminarily molded piece 13 unturned in a successive sequence as shown in FIG. 18.

Shown in FIG. 18 is a case where the ring-shaped preliminarily molded pieces are stacked with their axial end faces at the time of molding turned upside down every other layer. In a case where a gradient in the magnetic properties occurs in an upper layer only, or a gradient in the magnetic properties occurs in a lower layer only, the same effect as discussed above can be obtained by stacking the ring-shaped preliminarily molded piece of the relevant layer only with their axial end faces at the time of molding turned upside down.

In order to stack the ring-shaped preliminarily molded pieces 13 turned upside down as discussed above, there is provided a rotary actuator in a clamp portion of the tong-grip lifter 8*a* as shown in FIGS. 14(*a*) to 16(*b*).

Upon completion of the stacking process, the metal die parts 10*d*, 10*e* and the holder 10*b* are returned onto the palette 10*a* by the transfer mechanism 12 and conveyed to the die powder removal/setup unit 9 where a next process is performed.

The die powder removal/setup unit 9 is provided with a powder removal mechanism for removing magnetic powder adhering to the transferable metal die unit 10 and a setup mechanism for setting up the individual parts of the transferable metal die unit 10 in an initial condition which allows the powder feeding/filling unit 3 to feed the magnetic powder.

The powder removal mechanism has a nozzle (including a mechanism for moving the nozzle to the individual parts of the transferable metal die unit 10) which can blow nitrogen gas against the individual parts of the transferable metal die unit 10 and a vacuum mechanism for drawing and collecting the magnetic powder blown off by nitrogen gas.

With the provision of the powder removal mechanism and the setup mechanism, it is possible to smoothly carry out a next cycle of molding to the staking process.

The setup mechanism is a mechanism for lifting the die 10*f* positioned on the holder 10*j* shown in FIGS. 3(*a*) and 3(*b*) and moving the die 10*f* onto the lower punch 10*e* placed on the holder 10*b* upon completion of the stacking process.

A cylindrical molded body formed by stacking the ring-shaped preliminarily molded pieces 13 is transferred to a sintering/heat treatment furnace. After sintering and heat treatment at a specified temperature, the cylindrical molded body is subjected to finishing operation, as necessary, whereby the ring magnet 1 show in FIG. 1 is obtained.

According to a manufacturing system for manufacturing ring magnets of this embodiment, a plurality of transferable metal die units 10 are transported by use of the belt conveyor 2 and, at the same time, the processes of manufacturing axially short ring-shaped preliminarily molded pieces are performed and a necessary number of ring-shaped preliminarily molded pieces are stacked by the respective units provided at respective locations. This makes it possible to shorten tact time and manufacture ring magnets which are less susceptible to deterioration of magnetic properties in boundary regions between the adjacent ring-shaped preliminarily molded pieces with high productivity.

Second Embodiment

FIGS. 19(*a*) and 19(*b*) are a perspective view and a cross-sectional view showing a ring-shaped molded body formed by stacking ring-shaped preliminarily molded pieces according to a second embodiment of the present invention, and FIG.

Figure 20A:
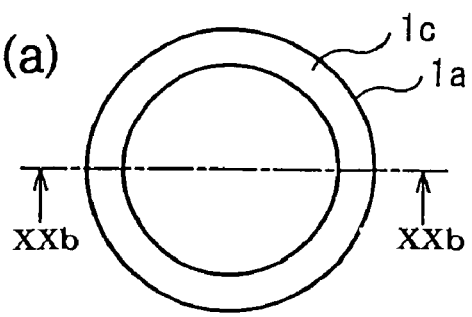
FIGS. 20(a) and 20(b) are a plan view showing a ring-shaped preliminarily molded piece and a cross-sectional view.
Figure 20B:
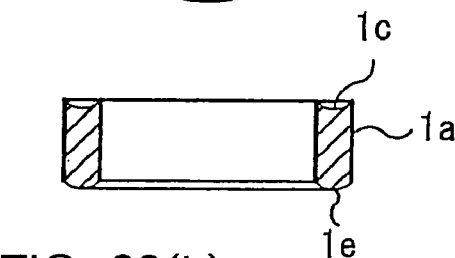

20(*a*) is a plan view showing one of the ring-shaped preliminarily molded pieces and FIG. 20(*b*) is a cross-sectional view taken along a line XXb-XXb of FIG. 20(*a*).

As shown in FIGS. 19(*a*) and 19(*b*), the ring-shaped molded body 1*b* is formed by stacking a plurality of (three as illustrated) ring-shaped preliminarily molded pieces 1*a* which are magnetically oriented in radial directions and joining the same into a single structure.

Also, as depicted in FIGS. 20(*a*) and 20(*b*), each of the ring-shaped preliminarily molded pieces 1*a* has a recess 1*c* formed in one end face all along the periphery thereof and a protrusion 1*e* formed on the other end face all along the periphery thereof. Since the ring-shaped preliminarily molded pieces 1*a* are joined into a single structure at each mating part 1*d* where the protrusion 1*e* fits into the corresponding recess 1*c*, it is possible to easily align central axes of the individual ring-shaped preliminarily molded pieces 1*a*.

Figure 21:
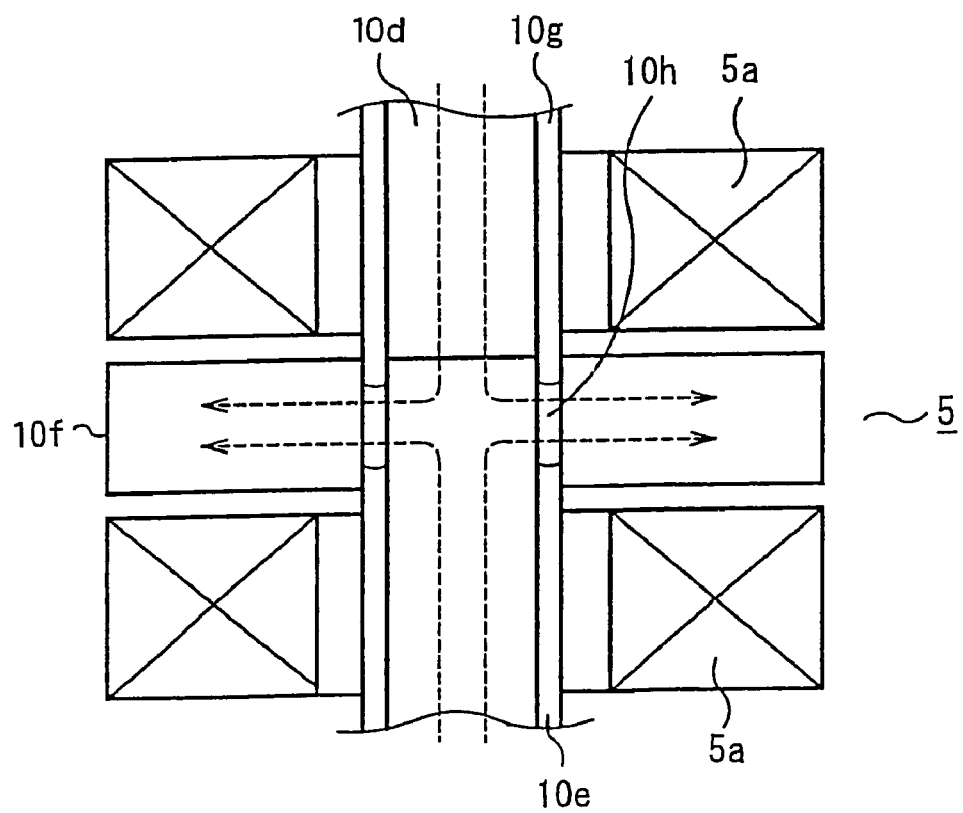
FIG. 21 is a cross-sectional view for explaining a magnetization molding method applied to the ring-shaped preliminarily molded piece.
Figure 22A:
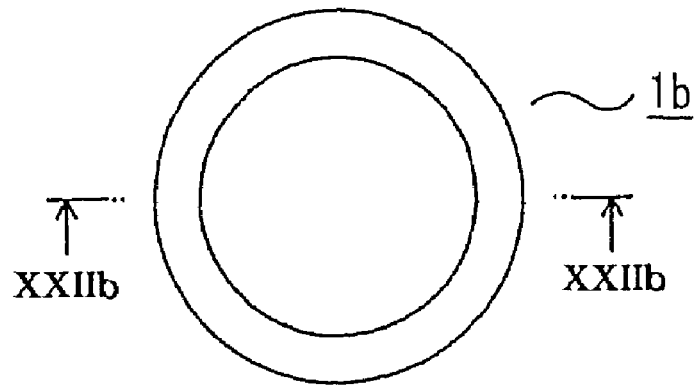
FIGS. 22(a)-22(e) are a plan view, FIG. 22(a), and a cross-sectional view, FIG. 22(b), taken along a line XXIIb-XXIIb of FIG. 22(a), showing a ring-shaped molded body having a shape of a modified form of the second embodiment of the present invention, and cross-sectional views, FIG. 22(c), FIG. 22(d), and FIG. 22(e), showing ring-shaped preliminarily molded pieces.
Figure 22B:
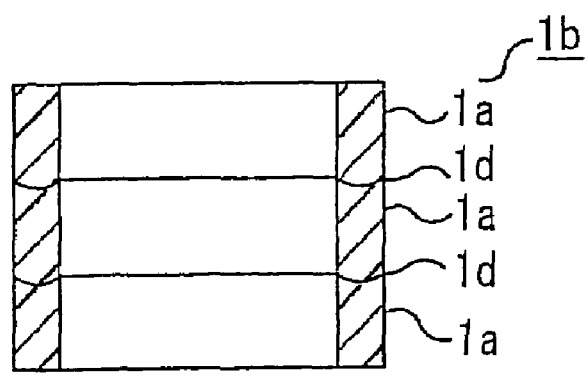
Figure 22C:
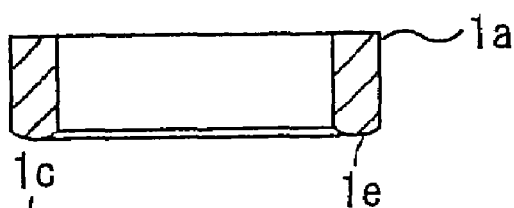
Figure 22D:
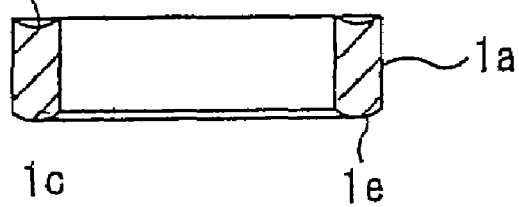
Figure 22E:

FIG. 21 is a cross-sectional view for explaining a magnetization molding method applied to the ring-shaped preliminarily molded pieces of this embodiment. As shown in this figure, a metal die unit includes a die 10*f* which is a ring-shaped ferromagnetic material element made of steel or super-hard material, for instance, upper and lower cores 10*d* made of steel, for instance, upper and lower punches 10*g*, 10*e* made of nonmagnetic stainless steel or super-hard material, in which an extreme end of one of the upper and lower punches 10*g*, 10*e* has an arciform convex shape whereas an extreme end of the other has a concave shape of an arciform form having the same radius of curvature as the arciform convex shape.

Also, the structure of this embodiment is such that a cavity 10*h* is formed amid a curved inner surface of the die 10*f* which is the ring-shaped ferromagnetic material element, curved outer surfaces of upper and lower cores 4 (sic), and the extreme end surfaces of the upper and lower punches 10*g*, 10*e* which are inserted between both.

There are provided annular electromagnetic coils 5*a* surrounding the upper and lower cores 10*d*. When currents are caused to flow through the electromagnetic coils 5*a*, there is generated an orienting magnetic field passing through the upper and lower cores 10*d* and the die 10*f* as indicated by arrows with broken lines.

Under conditions where the orienting magnetic field is applied, magnetic powder is fed into the cavity 10*h* and pressurized by the upper and lower punches 10*g*, 10*e*, whereby a radially oriented ring-shaped preliminarily molded piece 1*a* is obtained, one ringlike end face of the ring-shaped preliminarily molded piece 1*a* being concave-shaped and the other end face being convex-shaped.

A plurality of ring-shaped preliminarily molded pieces 1*a* thus obtained are stacked with their recesses 1*c* and protrusions 1*e* fitted to one another as shown in FIGS. 19(*a*) and 19(*b*) to obtain the ring-shaped molded body 1*b*. The ring-shaped preliminarily molded pieces 1*a* can be bonded into a single structure in a more reliable fashion by pressurizing them at a pressure which will not destroy the ring-shaped molded body 1*b* in an axial direction thereof, that is, a pressure of 50 MPa or less, after fitting the recesses 1*c* and protrusions 1*e* to one another.

It is possible to manufacture a ring magnet having a large axial length by sintering the ring-shaped molded body 1*b* thus obtained at a specified temperature in a specific atmosphere and then performing a heat treatment like aging.

According to the present embodiment, the ring-shaped molded body 1*b* is produced by stacking in a separate process the ring-shaped preliminarily molded pieces 1*a* which have been individually formed in the presence of the magnetic field. Therefore, disturbances in radial magnetic orientation, which occur in boundary regions of lamination of a prior art product produced by stacking individual molded pieces while forming them in a magnetic field, do not occur, making it possible to obtain ring magnets having good magnetic properties.

In addition, the recess 1*c* is formed in one end face of each ring-shaped preliminarily molded piece 1*a* while the protrusion 1*e* is formed on the other end face, and a plurality of such ring-shaped preliminarily molded pieces 1*a* are assembled into a single structure with the recesses 1*c* and the protrusions 1*e* fitted to one another. It is therefore possible to easily align central axes of the individual ring-shaped preliminarily molded pieces 1*a* and thereby obtain a product that offers high precision in shape and prevents displacement during transportation.

While the recess 1*c* and the protrusion 1*e* are formed at both end faces of the ring-shaped preliminarily molded pieces 1*a* in the topmost and bottommost layers in FIG. 19, it is possible to decrease the overall length of the ring-shaped molded body 1 by making the upper and lower end faces of the ring-shaped preliminarily molded pieces 1*a* in the topmost and bottommost layers flat, respectively.

FIGS. 22(*a*) and 22(*b*) are a plan view and cross-sectional view taken along line XXIIb-XXIIb of FIG. 22(*a*) showing a ring-shaped molded body 1*b* in which the upper and lower end faces of the ring-shaped preliminarily molded pieces 1*a* in the topmost and bottommost layers, respectively, are flattened FIGS. 22(*c*)-22(*e*) are cross-sectional views of the ring-shaped preliminarily molded pieces 1*a*. As depicted in the figures, the upper end face of the ring-shaped preliminarily molded piece 1*a* in the topmost layer (c) is made flat, the recess 1*c* and the protrusion 1*e* are formed on the upper and lower end faces of the ring-shaped preliminarily molded piece 1*a* in a middle layer (d), respectively, and the lower end face of the ring-shaped preliminarily molded piece 1*a* in the bottommost layer (e) is made flat.

It is possible to shorten the axial length and stabilize installation and transport conditions thereof by making the upper and lower end faces of the ring-shaped molded body 1*b* flat in a manner discussed above.

Third Embodiment

FIG. 23(*a*) is a plan view and FIGS. 23(*b*) and 23(*c*) are cross-sectional views taken along line XXIII(b)-XXXIII(b) of FIG. 23(*a*). FIG. 23(*b*) shows a ring-shaped preliminarily molded piece and FIG. 23(*c*) shows a ring-shaped molded body according to a third embodiment of the present invention. FIG. 24 is a cross-sectional view showing a modified form of the ring-shaped molded body of the third embodiment of this invention, in which the same reference numerals as used in FIGS. 19(*a*) and 19(*b*) indicate portions identical or corresponding to those of FIGS. 19(*a*) and 19(*b*).

While the recesses and the protrusions are arc-shaped in cross section in the aforementioned second embodiment, recesses 1*c* and protrusions 1*e* of the ring-shaped preliminarily molded pieces 1*a* are V-shaped in cross section as shown in FIGS. 23(*a*) and 23(*b*) in the present embodiment, and the ring-shaped molded body 1*b* is manufactured by fitting the recesses 1*c* and the protrusions 1*e* of a plurality of ring-shaped preliminarily molded pieces 1*a* to one another at mating parts 1*d* as shown in FIG. 23(*c*).

Also, it is possible to shorten the overall length of the ring-shaped molded body 1*b* and stabilize installation and transport conditions thereof by making an upper end face of the ring-shaped preliminarily molded piece 1*a* in the topmost layer and a lower end face of the ring-shaped preliminarily molded piece 1a in the bottommost layer flat as shown in FIG. 24.

Fourth Embodiment

Given in FIGS. 25(a)-25(c) are a plan view, FIG. 25(a), and cross-sectional views taken along line XXVb-XXVB in FIG. 25(a), FIG. 25(b) showing a ring-shaped preliminarily molded piece and FIG. 25(c) showing a ring-shaped molded body according to a fourth embodiment of the present invention. FIG. 26 is a cross-sectional view showing a modified form of the ring-shaped molded body of the fourth embodiment of this invention, in which the same reference numerals as used in FIGS. 19(a) and 19(b) indicate portions identical or corresponding to those of FIGS. 19(a) and 19(b).

In this embodiment, one end face of the ring-shaped preliminarily molded piece 1a is shaped into a slant surface sloping down toward an inner periphery to form a recess 1c and the other end face of the ring-shaped preliminarily molded piece 1a is shaped into a slant surface having the same angle of inclination as the recess 1c sloping down toward an outer periphery to form a protrusion 1e as shown in FIGS. 25(a) and 25(b), and the ring-shaped molded body 1b is manufactured by fitting the recesses 1c and the protrusions 1e of a plurality of ring-shaped preliminarily molded pieces 1a to one another at mating parts 1d as shown in FIG. 25(c).

Also, it is possible to shorten the overall length of the ring-shaped molded body 1b and stabilize installation and transport conditions thereof by making the upper end face of the ring-shaped preliminarily molded piece 1a in the topmost layer and the lower end face of the ring-shaped preliminarily molded piece 1a in the bottommost layer flat as shown in FIG. 26.

Fifth Embodiment

FIGS. 27(a)-27(c) are a plan view, FIG. 27(a), and cross-sectional views taken along line XXVIIb-XXVIIb, FIG. 27(b) showing a ring-shaped preliminarily molded piece and FIG. 27(c) showing a ring-shaped molded body according to a fifth embodiment of the present invention, and FIG. 28 is a cross-sectional view showing a modified form of the ring-shaped molded body of the fifth embodiment of this invention, in which the same reference numerals as used in FIGS. 19(a) and 19(b) indicate portions identical or corresponding to those of FIGS. 19(a) and 19(b).

In this embodiment, a ringlike groove arc-shaped in cross section is formed along the circumference in one end face of the ring-shaped preliminarily molded piece 1a to form a recess 1c while an arc-shaped projecting part having the same shape as the arc shape of the recess 1c is formed on the other end face of the ring-shaped preliminarily molded piece 1a to form a protrusion 1e as shown in FIGS. 27(a) and 27(b), and the ring-shaped molded body 1b is manufactured by fitting the recesses 1c and the protrusions 1e of a plurality of ring-shaped preliminarily molded pieces 1a to one another at mating parts 1d as shown in FIG. 27(c).

Also, it is possible to shorten the overall length of the ring-shaped molded body 1b and stabilize installation and transport conditions thereof by making the upper end face of the ring-shaped preliminarily molded piece 1a in the topmost layer and the lower end face of the ring-shaped preliminarily molded piece 1a in the bottommost layer flat as shown in FIG. 28.

In addition, the cross-sectional shape of the recesses 1c and the protrusions 1e is not limited to the arc-shaped form but may be V-shaped, trapezoidal or U-shaped.

Sixth Embodiment

FIGS. 29(a)-29(c) are a plan view, FIG. 29(a), and cross-sectional views taken along line XXIXb-XXIXb in FIG. 29(a), FIG. 29(b) showing a ring-shaped preliminarily molded piece and FIG. 29(c) showing a ring-shaped molded body according to a sixth embodiment of the present invention, and FIG. 30 is a cross-sectional view showing a modified form of the ring-shaped molded body of the sixth embodiment of this invention, in which the same reference numerals as used in FIGS. 19(a) and 19(b) indicate portions identical or corresponding to those of FIGS. 19(a) and 19(b).

In this embodiment, there is made a stepped structure between an inner peripheral part and an outer peripheral part of both end faces of the ring-shaped preliminarily molded piece 1a with a recess 1c formed at the inner peripheral part of one end face and a protrusion 1e formed at the inner peripheral part of the other end face as shown in FIGS. 29(a) and 29(b), and the ring-shaped molded body 1b is manufactured by fitting the recesses 1c and the protrusions 1e of a plurality of ring-shaped preliminarily molded pieces 1a to one another at mating parts 1d as shown in FIG. 29(c).

Although not illustrated, it is possible to easily fit the recesses and the protrusions of the preliminarily molded pieces to one another with provision of a stepped structure having a tapered shape.

Also, it is possible to shorten the overall length of the ring-shaped molded body 1b and stabilize installation and transport conditions thereof by making the upper end face of the ring-shaped preliminarily molded piece 1a in the topmost layer and the lower end face of the ring-shaped preliminarily molded piece 1a in the bottommost layer flat as shown in FIG. 30.

While the foregoing discussion of the first to sixth embodiments has illustrated cases in which the recess 1c and the protrusion 1e are formed in a ring-shaped pattern all along the circumference of the ring-shaped preliminarily molded piece 1a, either the recess 1c or the protrusion 1e may be formed in a broken pattern.

Seventh Embodiment

FIGS. 31(a)-31(c) are a plan view, FIG. 31(a), and cross-sectional views taken along line XXXIb-XXXIb of FIG. 31(a), FIG. 31(b) showing a ring-shaped preliminarily molded piece and FIG. 31(c) showing a ring-shaped molded body according to a seventh embodiment of the present invention. FIG. 32 is a cross-sectional view showing a modified form of the ring-shaped molded body of the seventh embodiment of this invention, in which the same reference numerals as used in FIGS. 19(a) and 19(b) indicate portions identical or corresponding to those of FIGS. 19(a) and 19(b).

In this embodiment, there are formed four generally hemispherical recesses 1c in one end face of the ring-shaped preliminarily molded piece 1a while there are made four projecting parts having the same generally hemispherical shape on the other end face of the ring-shaped preliminarily molded piece 1a to form protrusions 1e as shown in FIGS. 31(a) and 31(b), and the ring-shaped molded body 1b is manufactured by fitting the recesses 1c and the protrusions 1e of a plurality of ring-shaped preliminarily molded pieces 1a to one another at mating parts 1d as shown in FIG. 31(c).

Although the example of FIG. 31 illustrates a case where there are provided four each recesses 1c and protrusions 1e, the number of the recesses 1c and the protrusions 1e is not limited to four each but may be two or more each.

Also, it is possible to shorten the overall length of the ring-shaped molded body 1b and stabilize installation and transport conditions thereof by making the upper end face of the ring-shaped preliminarily molded piece 1a in the topmost layer and the lower end face of the ring-shaped preliminarily molded piece 1a in the bottommost layer flat as shown in FIG. 32.

Eighth Embodiment

FIGS. 33(a)-33(c) are a plan view, FIG. 33(a), a side view, FIG. 33(b), showing a ring-shaped preliminarily molded piece, and a side view, FIG. 33(c), showing a ring-shaped molded body according to an eighth embodiment of the present invention. FIG. 34 is a side view showing a modified form of the ring-shaped molded body of the eighth embodiment of this invention, in which the same reference numerals as used in FIGS. 19(a) and 19(b) indicate portions identical or corresponding to those of FIGS. 19(a) and 19(b).

In this embodiment, there are formed four recesses 1c, having a generally semicircular shape in cross section, extending in radial directions at 90° intervals in one end face of the ring-shaped preliminarily molded piece 1a while there are formed four semicircular protrusions 1e having the same generally semicircular shape in cross section, extending in the radial directions on the other end face of the ring-shaped preliminarily molded piece 1a as shown in FIGS. 33(a) and 31(b), and the ring-shaped molded body 1b is manufactured by fitting the recesses 1c and the protrusions 1e of a plurality of ring-shaped preliminarily molded pieces 1a to one another at mating parts 1d as shown in FIG. 33(c).

Although the example of FIG. 33 illustrates a case where there are provided four each recesses 1c and protrusions 1e, the number of the recesses 1c and the protrusions 1e is not limited to four each but may be two or more each.

Also, it is possible to shorten the overall length of the ring-shaped molded body 1b and stabilize installation and transport conditions thereof by making the upper end face of the ring-shaped preliminarily molded piece 1a in the topmost layer and the lower end face of the ring-shaped preliminarily molded piece 1a in the bottommost layer flat as shown in FIG. 34.

Ninth Embodiment

FIGS. 35(a)-35(e) are a plan view, FIG. 35(a), a side view, FIG. 35(b), showing a ring-shaped preliminarily molded piece and a side view, FIG. 35(c), showing a ring-shaped molded body according to a ninth embodiment of the present invention. FIG. 36 is a side view showing a modified form of the ring-shaped molded body of the ninth embodiment of this invention, in which the same reference numerals as used in FIGS. 19(a) and 19(b) indicate portions identical or corresponding to those of FIGS. 19(a) and 19(b).

The present embodiment is characterized in that each of the protrusions 1e and the recesses 1c of the foregoing eighth embodiment is reshaped to have, in a radially extending direction, a trapezoidal shape, in cross section, as shown in FIGS. 35(a) and 35(b).

While the example of FIGS. 35(a)-35(c) illustrates a case where four recesses 1c and protrusions 1e are provided at 90° intervals, the number of the recesses 1c and the protrusions 1e is not limited to four each but may be two or more each.

Also, it is possible to shorten the overall length of the ring-shaped molded body 1b and stabilize installation and transport conditions thereof by making the upper end face of the ring-shaped preliminarily molded piece 1a in the topmost layer and the lower end face of the ring-shaped preliminarily molded piece 1a in the bottommost layer flat as shown in FIG. 36.

Tenth Embodiment

FIGS. 37(a)-37(d) are a plan view, FIG. 37(a), side views, FIGS. 37(b) and 37(c), showing a ring-shaped preliminarily molded piece and a side view, FIG. 37(d), showing a ring-shaped molded body according to a tenth embodiment of the present invention. FIG. 38 is a side view showing a modified form of the ring-shaped molded body of the tenth embodiment of this invention, in which the same reference numerals as used in FIGS. 19(a) and 19(b) indicate portions identical or corresponding to those of FIGS. 19(a) and 19(b).

In this embodiment, there are alternately formed semicircular protrusions 1e and recesses 1c having a generally semicircular shape in cross section, extending in radial directions at 90° intervals in one end face of the ring-shaped preliminarily molded piece 1a while there are alternately formed semicircular recesses 1c and protrusions 1e having the same generally semicircular shape, in cross section, at 90° intervals on the other end face of the ring-shaped preliminarily molded piece 1a as shown in FIGS. 37(a), 37(b), and 37(c), and the ring-shaped molded body 1b is manufactured by fitting the recesses 1c and the protrusions 1e of a plurality of ring-shaped preliminarily molded pieces 1a to one another at mating parts 1d as shown in FIG. 37(d).

Although the example of FIGS. 37(a)-37(d) illustrates a case where there are provided two each recesses 1c and protrusions 1e, the number of the recesses 1c and the protrusions 1e is not limited to two each but may be one or more each.

Also, it is possible to shorten the overall length of the ring-shaped molded body 1b and stabilize installation and transport conditions thereof by making the upper end face of the ring-shaped preliminarily molded piece 1a in the topmost layer and the lower end face of the ring-shaped preliminarily molded piece 1a in the bottommost layer flat as shown in FIG. 38.

According to this embodiment, it becomes easier to produce a metal die for molding the ring-shaped preliminarily molded pieces 1a.

Eleventh Embodiment

FIGS. 39(a)-39(d) are a plan view, FIG. 39(a), and side views, FIGS. 39(b) and 39(c), showing a ring-shaped preliminarily molded piece and a side view, FIG. 39(d), showing a ring-shaped molded body according to an eleventh embodiment of the present invention. FIG. 40 is a side view showing a modified form of the ring-shaped molded body of the eleventh embodiment of this invention, in which the same reference numerals as used in FIGS. 19(a) and 19(b) indicate portions identical or corresponding to those of FIGS. 19(a) and 19(b).

The present embodiment is characterized in that each of the protrusions 1e and the recesses 1c of the foregoing ninth embodiment is reshaped into a radially extending trapezoidal shape, in cross section, as shown in FIGS. 39(a), 39(b), and 39(c), the protrusions 1e and the recesses 1c being alternately formed at 90° intervals.

Although the example of FIGS. 39(a)-39(d) illustrates a case where there are provided two each recesses 1c and protrusions 1e, the number of the recesses 1c and the protrusions 1e is not limited to two each but may be one or more each.

Also, it is possible to shorten the overall length of the ring-shaped molded body 1b and stabilize installation and transport conditions thereof by making the upper end face of the ring-shaped preliminarily molded piece 1a in the topmost layer and the lower end face of the ring-shaped preliminarily molded piece 1a in the bottommost layer flat as shown in FIG. 40.

In addition, while the foregoing eighth to eleventh embodiments have illustrated cases where the cross-sectional shapes of the recesses 1c and the protrusions 1e are generally semicircular or trapezoidal, the invention is not limited thereto but the recesses 1c and the protrusions 1e may be V-shaped, trapezoidal or U-shaped.

According to the aforementioned third to eleventh embodiments, it is possible to make ring magnets free of disturbances in radial magnetic orientation and having good magnetic properties, the ring magnets offering high precision in shape and a capability to prevent displacement of ring-shaped preliminarily molded pieces during transportation, as in the foregoing second embodiment.

While various kinds of recesses 1c formed in one end face of a ring-shaped preliminarily molded piece 1a and protrusions 1e formed on the other end face have thus far been illustrated with respect to their shapes in the aforementioned second to eleventh embodiments, the present invention is not limited to those shapes. What is essential for the structure of this invention is that a recess 1c and a protrusion 1e that fits into the recess 1c are provided in one end face and the other end face of a ring-shaped preliminarily molded piece 1a, respectively, the recesses 1c and the protrusions 1e of a plurality of preliminarily molded pieces 2 (sic) are fitted together such that relative movements in radial directions of the ring-shaped preliminarily molded pieces 1a stacked are constrained.

The ring magnets of this invention are applicable also to a method of stacking ring-shaped preliminarily molded pieces while forming the same in the presence of a magnetic field in a metal die.

To add, raw material of the ring-shaped molded body 1b may be powder of a magnetic substance, such as $Nd_2Fe_{14}B$, as well as a bondable magnetic material made by mixing a resin into magnetic powder.

INDUSTRIAL APPLICABILITY

The present invention is for use in manufacturing permanent magnets used in rotating electric machines, such as motors.

The invention claimed is:

1. A ring magnet comprising a plurality of ring-shaped preliminarily molded pieces, stacked in an axial direction of the molded pieces to form a tubular body for sintering, wherein
    each ring-shaped preliminarily molded piece includes first and second generally annular end faces that are transverse to the axial direction of each of the ring-shaped preliminarily molded pieces,
    each of the first end faces includes a plurality of recesses that are spaced apart along a circumferential direction of the first end faces,
    each of the second end faces includes a plurality of protrusions that are spaced apart along a circumferential direction of the second end faces and that are complementary in shape and location to the recesses on the first end faces, and
    the recesses and the protrusions of the ring-shaped preliminarily molded pieces adjacent to each other in the tubular body are engaged with each other to establish and maintain, with respect to rotation about the axial direction and translation transverse to the axial direction, relative rotational orientation and axial alignment between the ring-shaped preliminarily molded pieces in the tubular body.

2. The ring magnet as recited in claim 1, wherein the recesses and the protrusions include a plurality of spherical recesses and protrusions on the first and second end surfaces.

3. The ring magnet as recited in claim 1, wherein the recesses and the protrusions include extend in radial directions on the first and second end faces, respectively.

4. The ring magnet as recited in claim 3, wherein
    each of first and second annular end faces is defined by inner and outer edges, and
    the recesses and protrusions intersect the inner and outer edges of the first and second annular end faces.

5. The ring magnet as recited in claim 1, wherein the first end face includes a protrusion and the second end face includes a recess complementary in shape and position to the protrusion of said first end face.

6. The ring magnet as recited in claim 1, further including a ring-shaped preliminarily molded piece in a topmost layer of the tubular body and having an upper end face and a lower ring-shaped preliminarily molded piece in a bottommost layer of the tubular body and having a lower end face, wherein the upper end face and the lower end face are flat annular surfaces on which neither a recess nor a protrusion is present.

7. The ring magnet as recited in claim 1, wherein each of the first end faces includes at least three recesses and each of the second end faces includes at least three protrusions.

8. The ring magnet as recited in claim 1, wherein
    each of the first and second annular end faces is defined by inner and outer edges of the first and second end faces, and
    the recesses and the protrusions are spaced from the inner and outer edges of the first and second end faces.

9. A method of manufacturing a ring magnet, the method comprising:
    forming a plurality of ring-shaped preliminarily molded pieces, each preliminarily molded piece including opposed first and second generally annular end faces, transverse to an axial direction of the ring-shaped preliminarily molded pieces, each of the first end faces including a plurality of recesses that are spaced apart along a circumferential direction of the first end faces, and each of the second end faces including a plurality of protrusions spaced apart along a circumferential direction of the second end faces, complementary in shape and location to the recesses on the first end faces;
    forming a tubular body by stacking the ring-shaped preliminarily molded pieces in the axial direction of the ring-shaped preliminarily molded pieces with said recesses and protrusions of adjacent ring-shaped preliminarily molded pieces engaged to establish and maintain, with respect to rotation about the axial direction and translation transverse to the axial direction, relative rotational orientation and axial alignment between the ring-shaped preliminarily molded pieces in the tubular body; and
    sintering the tubular body.

10. The method of manufacturing a ring magnet as recited in claim 9, including pressurizing the ring-shaped preliminarily molded pieces at a pressure of up to 50 MPa along the axial direction in which the ring-shaped preliminarily molded pieces have been stacked.

11. The method of manufacturing a ring magnet as recited in claim 9, including forming at least three recesses and at least three protrusions in the first and second end faces, respectively.

12. The method of manufacturing a ring magnet as recited in claim 9, wherein
the first and second annular end faces are defined by inner and outer edges of the first and second end faces, and
the recesses and the protrusions are spaced from the first and second edges.

13. The method of manufacturing a ring magnet as recited in claim 9, wherein
the first and second annular end faces are defined by inner and outer edges of the first and second end faces, and
the recesses and the protrusions are radial and intersect the inner and outer edges of the first and second end faces.

14. The method of manufacturing a ring magnet as recited in claim 9, including successively transferring a plurality of transferable metal die units for execution of individual processes, each of the transferable metal die units including a die, a core which is inserted into the die to form a ring-like space between the die and the core, a lower punch which closes the bottom of the ring-like space and forms a cavity into which magnetic powder is fed to fill the cavity, and an upper punch for pressurizing the magnetic powder fed into the cavity, the method including:
filling the cavity with magnetic powder;
pressurizing the magnetic powder in the axial direction, while applying a radially orienting magnetic field to the cavity to form each of the ring-shaped preliminarily molded pieces;
drawing each of the ring-shaped preliminarily molded pieces out of the transferable metal die unit; and
stacking in multiple layers the ring-shaped preliminarily molded pieces drawn from the transferable metal die unit in the axial direction of the ring-shaped preliminarily molded pieces.

15. The method of manufacturing a ring magnet as recited in claim 14, including weighing the magnetic powder for filling the cavity.

16. The method of manufacturing a ring magnet as recited in claim 14, including moving the upper punch to a location above the cavity and inserting the upper punch into the cavity.

17. The method of manufacturing a ring magnet as recited in claim 14, including drawing each of the ring-shaped preliminarily molded pieces from the transferable metal die unit while pressurized in the axial direction.

18. The method of manufacturing a ring magnet as recited in claim 14, including removing the magnetic powder adhering to each of the ring-shaped preliminarily molded pieces in drawing the ring-shaped preliminarily molded piece out of the transferable metal die unit.

19. The method of manufacturing a ring magnet as recited in claim 14, including stacking the ring-shaped preliminarily molded pieces with the ring-shaped preliminarily molded pieces successively turned about central axes thereof, in stacking multiple layers the ring-shaped preliminarily molded pieces which have been drawn out of the transferable metal die unit in the axial direction of the ring-shaped preliminarily molded pieces.

20. The method of manufacturing a ring magnet as recited in claim 14, including stacking the ring-shaped preliminarily molded pieces, with axial end faces of the ring-shaped preliminarily molded pieces turned upside down in some layers, in stacking multiple layers of the ring-shaped preliminarily molded pieces which have been drawn out of the transferable metal die unit in the axial direction of the ring-shaped preliminarily molded pieces.

* * * * *